(12) United States Patent
Vigoda

(10) Patent No.: US 6,724,805 B1
(45) Date of Patent: Apr. 20, 2004

(54) NONLINEAR DYNAMIC SYSTEM FOR SPREAD SPECTRUM CODE GENERATION AND ACQUISITION

(75) Inventor: Benjamin Vigoda, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 755 days.

(21) Appl. No.: 09/713,644

(22) Filed: Nov. 15, 2000

Related U.S. Application Data
(60) Provisional application No. 60/165,576, filed on Nov. 15, 1999.

(51) Int. Cl.$^7$ .................................................. H04B 1/69
(52) U.S. Cl. ........................ 375/130; 375/141; 708/252
(58) Field of Search ................................ 375/130, 140, 375/141; 708/252, 250; 714/728, 704; 331/78; 380/46, 47

(56) References Cited

U.S. PATENT DOCUMENTS

| | | | |
|---|---|---|---|
| 5,291,555 A | | 3/1994 | Cuomo et al. .................. 380/6 |
| 5,293,425 A | | 3/1994 | Oppenheim et al. ........... 381/71 |
| 5,394,405 A | | 2/1995 | Savir ............................ 371/27 |
| 5,412,665 A | | 5/1995 | Gruodis et al. ................ 371/27 |
| 5,446,683 A | | 8/1995 | Mullen et al. ................ 364/717 |
| 5,566,099 A | * | 10/1996 | Shimada ..................... 708/250 |
| 5,579,337 A | | 11/1996 | Grinstein et al. ............ 375/206 |
| 5,612,973 A | | 3/1997 | Gershenfeld ................ 375/206 |
| 5,729,388 A | | 3/1998 | Gershenfeld ................ 359/637 |
| 5,737,360 A | | 4/1998 | Grinstein et al. ............ 375/206 |
| 6,560,338 B1 | * | 5/2003 | Rose et al. ..................... 380/47 |
| 6,560,727 B1 | * | 5/2003 | Pierson et al. ............... 714/704 |

FOREIGN PATENT DOCUMENTS

EP 0 936 748 A2 8/1999

OTHER PUBLICATIONS

Guckenheimer et al., *Applied Mathematical Sciences 42: Nonlinear Oscillations, Dynamical Systems, and Bifurcations of Vector Fields*, Table of Contents, Chapter 1, Springer–Verlag New York Inc. (1983).

Cuomo et al., "Circuit Implementation of Synchronized Chaos With Applications to Communications," *The American Physical Society*, vol. 71, No. 1 (Jul. 1993).

Cuomo et al., "Synchronization to Lorenz–Based Chaotic Circuits With Applications to Communications," *IEEE Transactions on Circuits and Systems II*, vol. 40, No. 10 (Oct. 1993).

Cuomo, "Synthesizing Self–Synchronizing Chaotic Systems," *International Journal of Bifurcation and Chaos*, vol. 3, No. 5 (1993).

(List continued on next page.)

*Primary Examiner*—Don N. Vo
(74) *Attorney, Agent, or Firm*—Testa, Hurwitz & Thibeault, LLP

(57) ABSTRACT

Nonlinear dynamic systems for generating and acquiring a spread spectrum signal pseudo-random noise (PN) signal are disclosed. An actuating signal is delayed by a first and second period to produce delayed actuating signals. A continuous, nonlinear function is applied to input that corresponds to the delayed actuating signals to produce an output signal. The function has values that correspond to the binary integer values of the mod 2 addition function of a linear feedback shift register, and a non-zero slope at those values. The output signal becomes a PN signal over time when it is fed back to the actuating signal. The output signal synchronizes with a spread spectrum reference input signal when it is superposed on the reference input signal to produce the actuating signal. The system may be incorporated into a transmitter or a receiver, either of which may be part of a larger communication system.

33 Claims, 32 Drawing Sheets

OTHER PUBLICATIONS

Wu et al., "A Simple Way to Synchronize Chaotic Systems With Applications to Secure Communications Systems," *International Journal of Bifurcation and Chaos*, vol. 3, No. 6 (1993).

Simon et al., *Spread Spectrum Communication Handbook*, Table of Contents, Part 1, Chapter 5, Part 4, Chapters 1–3, McGraw–Hill Inc. (1994).

* cited by examiner

NONLINEAR DYNAMIC SYSTEM FOR SPREAD SPECTRUM CODE GENERATION AND ACQUISITION

CROSS-REFERENCE TO RELATED APPLICATION

This application claims priority to and the benefit of U.S. Provisional Patent Application Ser. No. 60/165,576, which was filed on Nov. 15, 1999, and which is incorporated by reference.

TECHNICAL FIELD

The invention relates generally to communication and/or measurement systems and, more particularly, to systems that use spread spectrum modulation to convert relatively narrow-band information, or message, signals to wide-band signals for transmission.

BACKGROUND

Demand for bandwidth resources as well as consumer telecommunications applications will drive the development of low-cost, low-power short-range transceivers. More efficient use of bandwidth can be made by tiling a cellular wireless system using a greater number of shorter range transceivers. This approach is called Space Division Multiple Access (SDMA) to draw a parallel to Time and Code Division Multiple Access (TDMA and CDMA). In a cellular or multi-hop peer-to-peer network, messages hop from one transceiver to another across a field of transceivers. The basic idea behind SDMA is to simultaneously increase the density and decrease the range of transceivers, the result is an increase in maximum number of message packets that may be transmitted across the network at any given instant because each message occupies less physical space at any given instant in time. To avoid frequent packet collisions, however, each transceiver needs to be able to share the available spectrum.

In addition to their use in wireless networks, short range transceivers will soon find consumer application in the home, automobile, and likely in wearable or "personal area" networks (PANs). If the internet is to become portable, then short range transceivers will become increasingly important for transmitting information over the last few meters to the user. Just as with present day cell phones, many of theses devices will need to be able to communication on a shared spectrum to a single base station. Therefore these transceivers require a low-cost, low-power, low-complexity scheme for channel sharing.

Direct Sequence Spread Spectrum (DS SS) offers an attractive solution to the channel sharing problem. The advantages of spread spectrum in general and DS SS in particular are manifold. Virtually all high performance commercial wireless systems employ DS SS. In addition to providing a simple scheme for channel code allocation, DS SS offers low peak power, excellent resistance to interference including interference from echoes known as multipath interference, easily scalable processing gain, excellent bandwidth efficiency when use in a micro-cell system, and graceful rather than catastrophic bit error rate (BER) degradation as more transceivers share the channel. In addition, improvements for DS SS systems are of interest for their applications in making high resolution timing measurements.

FIG. 1 illustrates a generalized functional block diagram of a spread spectrum communication system 10. The transmitter 20 includes a pseudo-random number (PN) generator 24 that generates a string of pseudo random bits known as a PN sequence, x(t). This PN sequence is a string of bits that appear random by statistical standards, but which are actually generated by a deterministic algorithm. The PN sequence is effectively the carrier signal. The modulator 28 modulates the PN sequence by the message signal, m(t), thereby producing the transmit signal, T(t). The transmit signal is a bit stream that behaves like white noise, but has data hidden in it.

A received signal, S(t), is received by a receiver 30. The received signal may be the transmit signal itself or it may be an attenuated and/or noisy version of the transmit signal due to interactions that occur over the transmission distance 14. A receiver, such as receiver 30 in FIG. 1, must have a PN synchronizer 34 to recover the message signal from the received signal. The PN synchronizer is a PN generator that produces the same PN sequence as that created by the PN generator 24 in the transmitter 20 and that synchronizes its own PN sequence with that of the received signal. The receiver uses the synchronized PN sequence to demodulate the received signal and recover the message signal. In the process, the receiver ignores all other data signals modulated by other PN sequences, which is how DS SS helps solve the channel sharing problem.

The communication system illustrated in FIG. 1 appears simple but is actually difficult to implement. The difficulty lies in getting the PN synchronizer 34 in the receiver 30 to generate a PN sequence that is synchronized with the PN sequence generated by the PN generator 24 in the transmitter 20. Achieving this synchronization is called code acquisition. Maintaining synchronization is called tracking.

State-of-the-art acquisition systems can have long and unpredictable acquisition times which make them unacceptable for multi-hop peer-to-peer networks which make and break connections often as they route traffic. Acquisition times much less than the time it takes to transmit a packet are desirable for a short range transceiver system. Present day acquisition systems are also power-hungry, because they use high-speed Digital Signal Processing (DSP) components. The energy consumption of these components scales linearly (at best) with the frequency of the operations they perform. State-of-the-art acquisition systems are also relatively expensive to manufacture because it is essentially impossible to integrate the high speed 3,5 semiconductor components they require with a baseband system for which standard silicon is adequate.

A typical spread spectrum communication system will include an Linear Feedback Shift Register (LFSR) as the PN generator 24 in the transmitter 20 of FIG. 1. The general equation for an LFSR follows:

$$x_n = \sum_{i=1}^{N} a_i x_{n-1} (mod\ 2)$$

From the theory of LFSR's, $a_N=1$ always whereas $a_i=1$ sets a tap of a given delay n and $a_i=0$ sets no tap. The equation describes a delay line of length N, with taps at delays for which $a_i=1$. The outputs of the taps are summed mod 2 and then shifted into the register. All $x_n$ always takes a discrete value of either 0 or 1.

FIG. 2 illustrates a functional block diagram of a four-bin, two-tap LFSR that implements the following recursion relation:

$$x(t+\tau)=x(t-\tau)+x(t-4\tau)\ mod\ 2$$

FIG. 2 shows four bins in series with the first and fourth bin tapped. A tap communicates the value of the tapped bin to the mod 2 addition functional element. The mod 2 addition functional element then communicates the result to the first bin. The LFSR operates recursively going through a complete PN sequence and then repeating it. A bin is essentially a delay element that holds the value that the previous bin had before it updated.

FIG. 3 is a functional block diagram of an analog PN generator, known as the Cosine Analog Feedback Shift Register (Cosine AFSR) and proposed by Grinstein et al. in U.S. Pat. No. 5,737,360. The Cosine AFSR represents the first attempt at an analog device that produces a PN sequence for use in a spread spectrum communication system. A spread spectrum communication system may include a Cosine AFSR as the PN generator 24 in the transmitter 20 of FIG. 1. Such a Cosine AFSR would directly feed back the output of the cosine function to the first bin. A spread spectrum communication system may also or alternatively include a Cosine AFSR as the PN sequencer 34 in the receiver 30 of FIG. 1. Such a Cosine AFSR would use the adder to superpose the received signal onto the output of the cosine finction. FIG. 3 specifically illustrates a Cosine AFSR that implements the following general equation:

$$x_n = \frac{1}{2}\left[1 - \cos\left(\pi \sum_{i=1}^{N} a_i x_{n-1}\right)\right]$$

A flaw in the Grinstein et al. discrete time Cosine AFSR is revealed when one attempts to use it to synchronize with a noisy PN sequence. One thousand such trials were run. In the trials, successful acquisition was defined as having produced 2N+1 error-free chips identical to the transmit LFSR, where N is the number of bins in the register. A trial consisted of running a 15-bin DT Cosine AFSR for 400 chips or until it performed successful acquisition. With Gaussian noise on the transmit channel with a variance of 0.5, the Cosine AFSR never successfully performed acquisition within 400 chips.

SUMMARY OF THE INVENTION

Nonlinear differential equations and iterated maps can be used to emulate digital processing. The pseudo-random bit stream that is used as a pseudo-carrier in spread spectrum communication systems is typically generated by a linear feedback shift register. We have found, however, that an equivalent pseudo-random bit stream may be generated by a nonlinear dynamic system. The present invention utilizes a nonlinear dynamic system designed to generate and, in some embodiments, acquire the pseudo-random bit stream used in spread spectrum communication. The present invention represents an analog signal processing system derived from nonlinear dynamic system analysis.

As a result, the present invention may be implemented using analog components, which are typically cheaper than their more sophisticated digital counterparts. Further, analog signal processing promises to be less power-hungry and easier to integrate with other components than high-speed DSP. Finally, a discrete time embodiment of the present invention has been shown to acquire a noisy PN sequence whereas the prior art discrete time Cosine AFSR has failed to do so.

In general, in one aspect, the invention features a method for generating a pseudo-random noise sequence. An actuating signal is delayed by a first period to produce a first delayed actuating signal. The actuating signal is also delayed by an integer multiple of the first period to produce a second delayed actuating signal. A continuous, nonlinear function is applied to a first input that corresponds to the first delayed actuating signal and a second input that corresponds to the second delayed actuating signal to produce an output signal. The function has values that correspond to the binary integer values of a mod 2 addition function of a linear feedback shift register. The finction also has a non-zero slope at those values. Feeding back the output signal into the actuating signal causes the output signal to become a pseudo-random noise signal over time.

In general, in a second aspect, the invention features an apparatus for generating a pseudo-random noise sequence. The apparatus includes a delay element, a nonlinear element, and a feedback connection. The delay element produces a first delayed actuating signal and a second delayed actuating signal by delaying an actuating signal by a first period and a second period respectively. The second period is approximately an integer multiple of the first period. The first and second delay periods correspond to the tap placement in a conventional linear feedback shift register. The nonlinear element applies a continuous, nonlinear function to a first input that corresponds to the first delayed actuating signal and a second input that corresponds to the second delayed actuating signal to produce an output signal. The function has values that correspond to the binary integer values of a mod 2 addition function of a linear feedback shift register. The function also has a non-zero slope at those values. The feedback connection between the nonlinear element and the delay causes the output signal to become a pseudo-random noise signal over time.

The function that produces the output signal in the method and that is embodied by the nonlinear element in the apparatus may have a non-zero slope when the first input equals the second input and, additionally or alternatively, when the first input equals the negative of the second input plus a constant. In some embodiments, the output of the function is bounded by setting the output signal to a positive extreme value that corresponds to the one value of the mod 2 addition function of the linear feedback shift register whenever it is greater than or equal to the positive extreme value. In some embodiments, the output of the function is bounded by setting the output signal to a negative extreme value that corresponds to the zero value of the mod 2 addition function of the linear feedback shift register whenever it is less than or equal to negative extreme value. In one embodiment, the function approximates a quadratic function within the bounds. In a related embodiment, the function is a quadratic function. In a second embodiment, the function approximates an absolute value function within the bounds.

In some embodiments, the method further includes delaying the actuating signal by a third period to produce a third delayed actuating signal. The third period is approximately an integer multiple of the first period. In such embodiments, the output signal of the continuous, nonlinear function is considered a first output signal. The feeding back step includes applying a second continuous, nonlinear function to a third input that corresponds to the third delayed actuating signal and to a fourth input that corresponds to the first output signal to produce a second output signal. The second function has values that correspond to the binary integer values of the mod 2 addition function of a linear feedback shift register and a non-zero slope at those values. The second output signal is fed back to the actuating signal causing the second output signal to become a pseudo-random noise signal over time. This approach can be extended to add additional steps in which the actuating signal is delayed to create additional delayed actuating signals and in which additional nonlinear functions are applied to input that corresponds to either a delayed actuating signal or to an output signal from a previous step.

In some embodiments, the method further includes delaying the actuating signal by a third and a fourth period to produce a third and a fourth delayed actuating signal, respectively. The third and fourth periods are each approximately integer multiples of the first period. A second continuous, nonlinear function is applied to a third input that corresponds to the third delayed actuating signal and to a fourth input that corresponds to the fourth delayed actuating signal to produce a second output signal. In such embodiments, the output signal of the continuous, nonlinear function is considered a first output signal. The feeding back step includes applying a third continuous, nonlinear function to a fifth input that corresponds to the first output signal and to a sixth input that corresponds to the second output signal to produce a third output signal. The second and third functions have values that correspond to the binary integer values of the mod 2 addition function of a linear feedback shift register and non-zero slopes at those values. The third output signal is fed back to the actuating signal causing the third output signal to become a pseudo-random noise signal over time. Again, this approach can be extended to add additional steps in which the actuating signal is delayed to create additional delayed actuating signals and in which additional nonlinear functions are applied to input that corresponds to either a delayed actuating signal or to an output signal from a previous step.

In some embodiments of the apparatus, the delay element produces a third delayed actuating signal in which the delay period is approximately an integer multiple of the first period. In such embodiments, the feedback connection incorporates a second nonlinear element that applies a second continuous, nonlinear function to produce a second output signal. The second function has values that correspond to the binary integer values of the mod 2 addition function of a linear feedback shift register and a non-zero slope at those values. A third input that corresponds to the third delayed actuation signal and a fourth input that corresponds to the output signal from the original continuous, nonlinear function are input to the second function. The second output signal is communicated to the delay element causing the second output signal to become a pseudo-random noise signal over time.

In some embodiments of the apparatus, the delay element produces a third and fourth delayed actuating signal in which the delay periods are both approximately integer multiples of the first period. The apparatus further includes a second nonlinear element that applies a second continuous, nonlinear function to produce a second out put signal. A third input that corresponds to the third delayed actuation signal and a fourth input that corresponds to the fourth delayed actuation signal are input to the second function. In such embodiments, the feedback connection incorporates a third nonlinear element that applies a third continuous, nonlinear function to produce a third output signal. A fifth input that corresponds to the output signal of the original nonlinear element and a sixth input that corresponds to the second output signal are input to the second function. The third output signal is communicated to the delay element causing the third output signal to become a pseudo-random noise signal over time. The second and third functions have values that correspond to the binary integer values of the mod 2 addition function of a linear feedback shift register and non-zero slopes at those values.

Some embodiments of the invention are continuous time systems. A continuous time method may use the first delayed actuating signal as the first input and the second delayed actuating signal as the second input. A continuous time apparatus may do the same.

Other embodiments of the invention are discrete time systems. A discrete time method periodically samples the first delayed actuating signal to produce a sample that may be used as the first input and periodically samples the second delayed actuating signal to produce a sample that may be used as the second input. To implement the discrete time method, a discrete time apparatus will incorporate a sampling device for each delayed actuating signal. Each sampling device may further comprise an averaging device, such as a low pass filter, and a sample and hold element. One averaging device will produce a first signal average by averaging the first delayed actuating signal. The associated sample and hold element will produce the first input by sampling the first signal average. The second sampling device will be similar. The sample and hold element may rely on a chip clock signal for proper timing of the sampling, and may further be driven by the chip clock signal.

The method or apparatus may further synchronize the pseudo-random noise sequence that is generated with a reference input signal. As noted above, achieving synchronization is known as acquisition. To acquire a reference input signal, the method requires the output signal to be superposed on the reference input signal to produce the actuating signal. This is accomplished in the apparatus by means of an adder incorporated into the feedback connection. The adder implements the superposition required by the method and causes the output signal to acquire the reference input signal over time. The chip clock signal may be generated by a phase locked loop in signal communication with the reference input signal or the output signal. It may alternatively be received via a sideband carrier of the reference input signal.

In embodiments that acquire a reference input signal, the method or apparatus may be part of a receiver. In such embodiments, the reference input signal may be a pseudo-random noise signal that is modulated with a message signal. The reference input signal may be received by an input device which is part of the apparatus. The message signal may further be recovered from the reference input signal. A demodulator in the apparatus may be used to recover the message signal. Such a receiver may also synchronize with a reference input signal that is an unmodulated pseudo-random noise signal.

The receiver may further be part of a spread spectrum communication system. In such embodiments, a linear feedback shift register may be used to generate a pseudo-random noise signal. Alternatively, an analog feedback shift register may be used to generate the pseudo-random noise signal. The pseudo-random noise signal may be modulated with a message signal to create a transmission signal. Finally, in related embodiments the receiver may receive a corrupted and/or attenuated transmission signal as the reference input signal.

The foregoing and other objects, aspects, features, and advantages of the invention will become more apparent from the following description and from the claims.

BRIEF DESCRIPTION OF THE DRAWINGS

In the drawings, like reference characters generally refer to the same elements throughout the different views. Also, the drawings are not necessarily to scale, emphasis instead generally being placed upon illustrating the principles of the invention.

DETAILED DESCRIPTION

Figure 1:
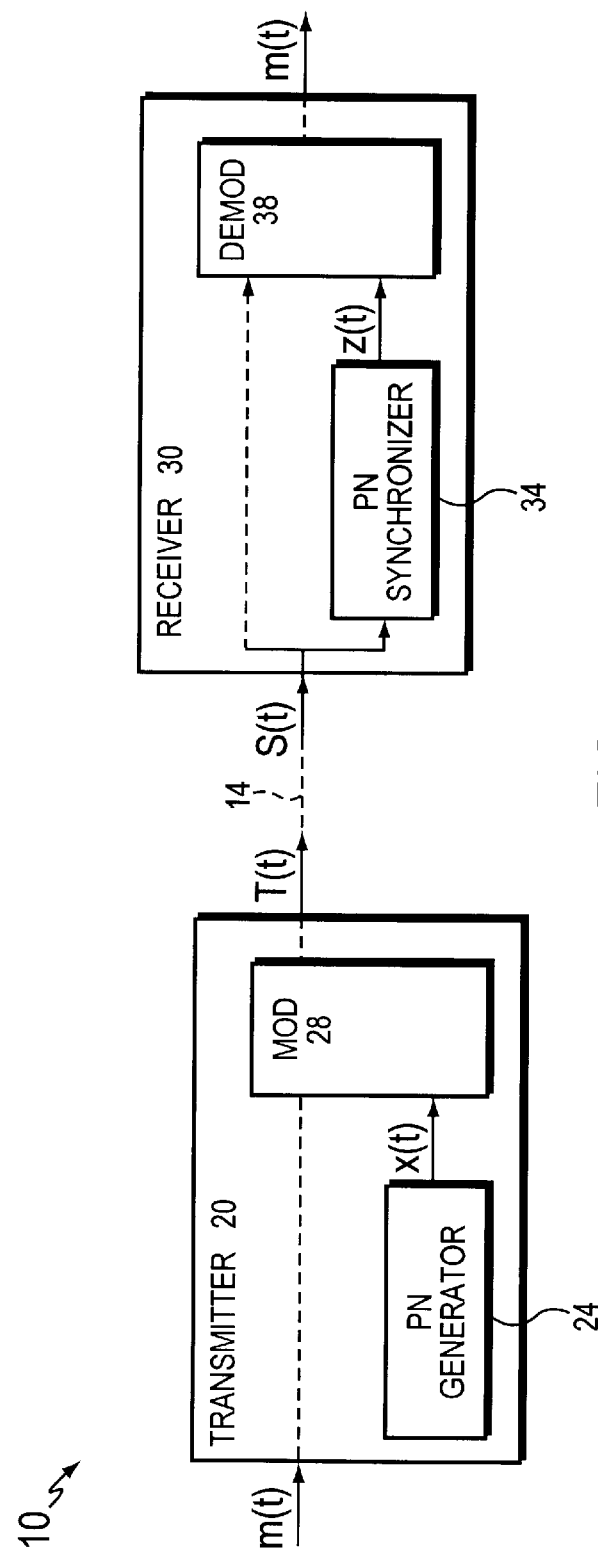
FIG. 1 is a functional block diagram of a spread spectrum communication system.
Figure 2:
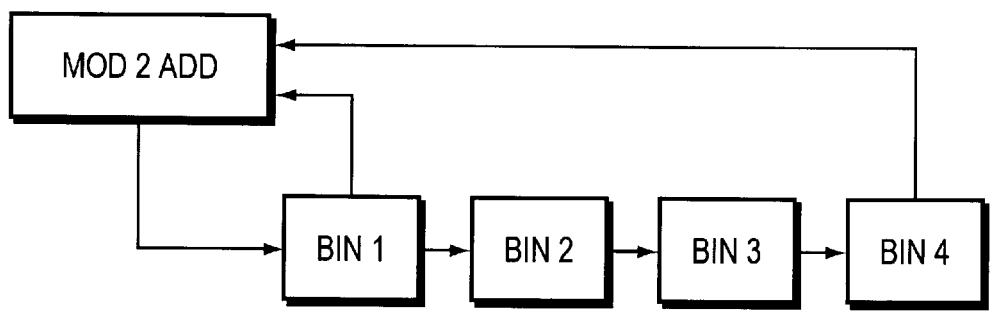
FIG. 2 is a functional block diagram of a four-bin, two-tap linear feedback shift register from the prior art, which may be incorporated into FIG. 1 as the PN generator 24.
Figure 3:
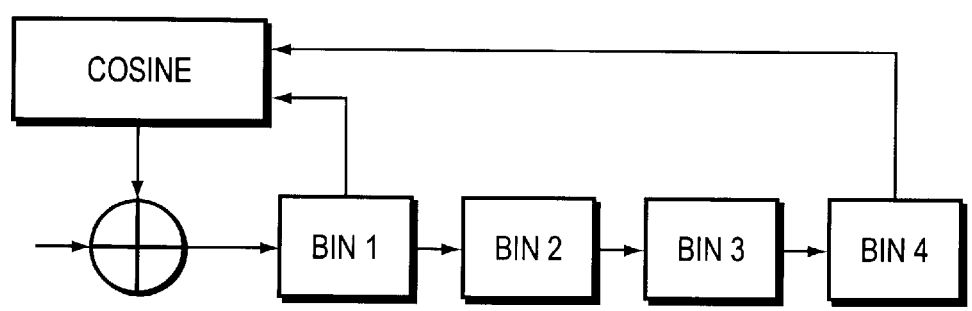
FIG. 3 is a functional block diagram of a four-bin, two-tap Cosine Analog Feedback Shift Register (Cosine AFSR) from the prior art.

The present invention exploits nonlinear dynamic systems to generate, and in some embodiments, acquire a PN sequence. Accordingly, we begin with an overview of the techniques for understanding nonlinear dynamic systems. These techniques facilitate the characterization of a nonlinear dynamics system that can be used to generate a PN sequence or to acquire a noisy PN sequence.

Unlike a linear dynamic system, an equation that describes a nonlinear dynamic system does not necessarily have a single solution that is valid for all inputs and/or for all times. Fortunately, the local existence and uniqueness theorem does guarantee a solution to a given nonlinear differential equation for a specified initial condition. In particular, the theorem states that given any possible differential equation, a domain which is a subset of real Euclidean space for which there is a smooth mapping of the domain to the real numbers, and an initial condition, there exists a single solution defined for an interval that maps to the domain that passes through the initial condition.

The primary technique used to characterize the behavior of a nonlinear dynamic systems is to vary the coefficients of the nonlinear terms in a nonlinear differential equation and to examine the effects of changing the amount of nonlinearity in the equation. A fixed point in a nonlinear function is simply defined as a point at which the output equals the input. Fixed points can be determined using the trial and error method by comparing the output of a nonlinear equation to its input. This technique of identifying fixed points may be time consuming. Once a fixed point of the nonlinear function is identified, however, it is possible to find whether the known fixed point is stable or unstable mathematically, thereby helping to characterize the nonlinear system. A fixed point is stable if the derivative of the function at the fixed point is less than one. Likewise, a fixed point is unstable if the derivative of the function at the fixed point is greater than or equal to one. Similarly, the area around a fixed point is stable where the derivative of the function is less than one.

Lyapunov theory offers two methods for understanding nonlinear dynamic systems. The direct Lyapunov method, or Lyapunov function method, is a powerful tool for finding stable (equilibrium) points toward which a nonlinear system will settle. The method involves devising a function, usually an energy-like quantity that decreases for $|x|$ sufficiently large so that $x(t)$ remains bounded for all t and all bounded initial conditions. The method requires a positive definite function that decreases along the solution curves of the differential equation to be found. It may be difficult to find such a function.

Lyapunov theory, as it relates to the direct Lyapunov method, assumes that there is a fixed point, known as $\bar{x}$. It further assumes that there is a differentiable function, known as $V(x)$, defined on a neighborhood of $\bar{x}$ that maps to the real number domain. The function $V(x)$ is positive everywhere except at the fixed point $\bar{x}$ where it is zero. The direct method states that that the fixed point $\bar{x}$ is an asymptotically stable fixed point if the derivative of the function $V(x)$ with respect to $x$ is less than zero everywhere in neighborhood of $\bar{x}$ except where $x=\bar{x}$. It further states that the fixed point $\bar{x}$ is a stable fixed point if, once again, the derivative of the function $V(x)$ with respect to x is less than zero everywhere in neighborhood of $\bar{x}$ except where $$\dot{V} = \sum_{j=1}^{n} \dot{x}_j \frac{\partial}{\partial x_j} V.$$

The indirect Lyapunov method, or linearization method, states that the stability properties of a nonlinear system in close proximity to an equilibrium point are essentially the same as those of its linearized approximation. Accordingly, if we are interested in solutions of a strongly nonlinear equation after it settles down to equilibrium, we can ignore the nonlinear terms in the equation and solve the equation.

A point $\bar{x}$ is a hyperbolic or non-degenerate fixed point when $Df(\bar{x})$, the Jacobian of the linearization of the nonlinear flow around $\bar{x}$, has no eigenvalues with a zero real part. The asymptotic behavior of solutions near a hyperbolic fixed point is determined by the linearization of the system. A non-hyperbolic fixed point is best illustrated by an example. We can write the equation, $\ddot{x}+\epsilon+^2\dot{x}+x=0$ as follows, using $x_1=x$ and $x_2=\dot{x}$:

$$\begin{bmatrix} \dot{x}_1 \\ \dot{x}_2 \end{bmatrix} = \begin{bmatrix} 0 & 1 \\ -1 & 0 \end{bmatrix}\begin{bmatrix} x_1 \\ x_2 \end{bmatrix} - \varepsilon\begin{bmatrix} 0 \\ x_1^2 \; x_2 \end{bmatrix}$$

The eigenvalues, $\lambda=\pm i$, have a zero real part so there is no hyperbolic fixed point for this system. As a result, unless $\epsilon=0$, the fixed point $(x_1, x_2)=(0, 0)$ is not a center. If $\epsilon>0$, then it is a non-hyperbolic or weak attracting spiral sink. Similarly, if $\epsilon<0$, then it is a repelling source.

A third technique for understanding nonlinear dynamics is the creation of a visual representation of a nonlinear function. In accordance with this technique, each real number input to the nonlinear function is plotted against the real number output of the nonlinear function to create the visual representation.

Figure 4:
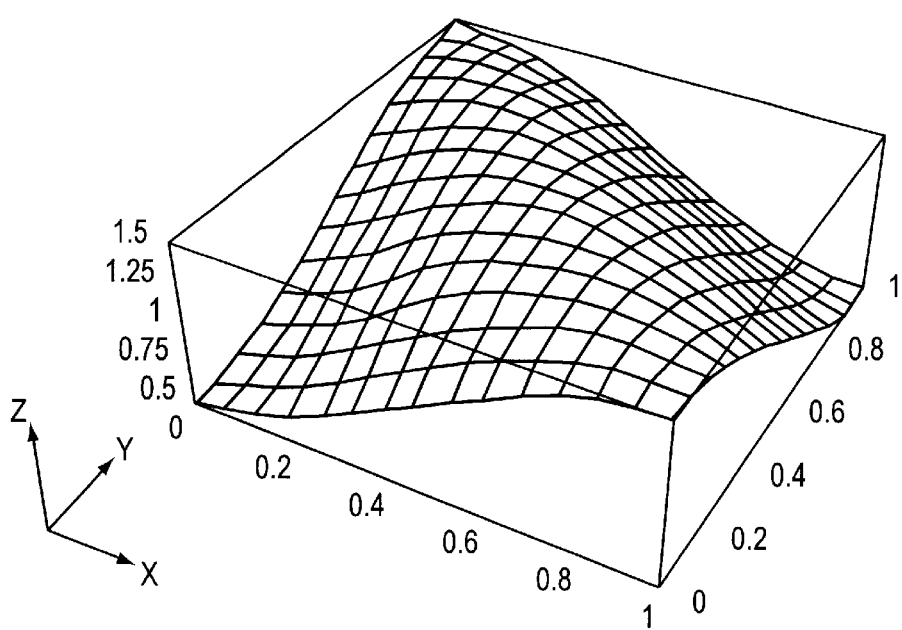
FIG. 4 is a visual representation of the function of the Cosine AFSR from the prior art.

A visual representation of the cosine function quickly reveals the reason for the failure of the discrete time Cosine AFSR to acquire a noisy PN sequence. FIG. 4 is a visual representation of the cosine function of the Cosine AFSR in which the x axis corresponds to the state of the first tapped bin, the y axis corresponds to the state of the second tapped bin, and the z axis corresponds to the output of the cosine function. FIG. 4 reveals that the cosine function has a zero slope when the y value equals the negative of the x value plus a constant. When the constant equals one and the cosine function is scaled appropriately as shown in FIG. 4 for example, the result is that the Cosine AFSR is susceptible to the slightest perturbation due to noise approaching the fixed point at which x equals 1 and y equals 0 and the fixed point at which x equals 0 and y equals 1. Clearly, an approach other than that proposed by Grinstein et al. is necessary for practical acquisition of the PN sequence of a reference input signal.

A nonlinear system designed to work with a linear equivalent should be characterized by a function that corresponds to the linear system at its fixed points. Accordingly, a nonlinear dynamic system designed to synchronize with a PN sequence should produce values that correspond to the PN sequence generator at its output values. Since the standard PN sequence generator is an LFSR, a nonlinear dynamic system designed to synchronize with a PN sequence should produce values that correspond to the LFSR. This requirement, essentially an imposition of the requirement to correspond with fixed points, is necessary for the nonlinear function to be able to synchronize with the LFSR.

Required characteristics: Ordinarily, an appropriate nonlinear function to use as the basis for the PN synchronizer 34 of the receiver 30 of the spread spectrum communication system of FIG. 1 will also have the following characteristics. The function will be continuous and smooth in the neighborhood of interest. Such a function will be differentiable with respect to x for all x elements between an x value that corresponds to the one value of the mod 2 addition function of the LFSR and an x value that corresponds to the zero value of the mod 2 addition function of the LFSR. Such a function will also be differentiable with respect to y for y elements between a y value that corresponds to the one value of the mod 2 addition function of the LFSR and a y value that corresponds to the zero value of the mod 2 addition function of the LFSR. The function will have values that correspond to the binary integer values of the mod 2 addition function of an LFSR. It will also have a non-zero slope at those values.

Desirable characteristics: The function may also desirably (but not necessarily) have a non-zero slope approaching the values corresponding to the LFSR. Instability between the values corresponding to the LFSR should cause the function to approach those values over time and therefore be able to lock on to a noisy PN sequence. The following characteristics may additionally be desirable for an appropriate nonlinear function for the PN synchronizer 22 of the receiver 20 of the spread spectrum communication system of FIG. 1: (1) symmetrical for smoother convergence to values that correspond to the LFSR; and (2) simple to implement in hardware. The first desirable characteristic ensures that the nonlinear function smoothly converges to values that correspond to the LFSR. The second desirable characteristic can make the PN synchronizer inexpensive to implement. The function may have a non-zero slope when the first input equals the second input. The function may alternatively or additionally have a non-zero slope when the first input equals the negative of the second input plus a constant.

Absolute value function: It has been found that absolute value functions can be used in the practice of the present invention. The basic equation for an absolute value function follows:

$$z=|x-y|-|x+y|$$

Figure 5:
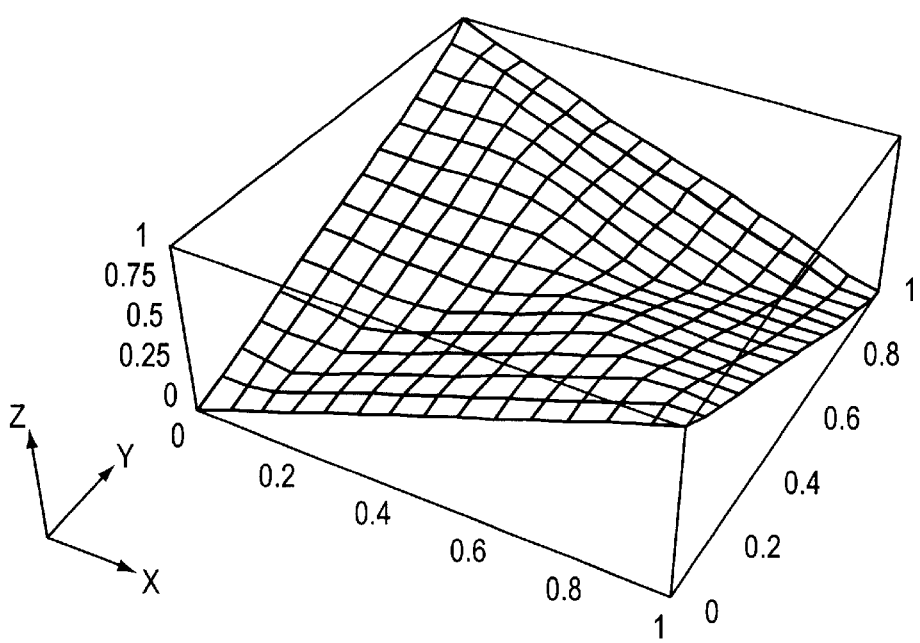
FIG. 5 is a visual representation of an absolute value function.

FIG. 5 is a visual representation of an absolute value function in which the z axis corresponds to the output of the function and the x and y axes correspond to the two inputs of the function. The x and y values may also correspond to two taps of a shift register. FIG. 5 illustrates characteristics of the absolute value function that are of interest. For example, FIG. 5 shows that the absolute value function is continuous and smooth and that it has values that correspond to the binary integer values of the mod 2 addition function of an equivalent LFSR at the vertices of the cube. FIG. 5 further shows that the absolute value function has a non-zero slope at all of the values that correspond to the binary integer values of a the mod 2 addition function of an LFSR that are the vertices of the cube. FIG. 5 finally shows that the absolute value function has a non-zero slope between and approaching the vertices corresponding to the LFSR's binary integer values, which will cause the system to move toward those vertices as it approaches acquisition. Because the absolute value function has the required characteristics, it should be an effective nonlinear function for synchronizing with a PN sequence.

The specific absolute value function that will be used as the nonlinear function for generating and, optionally, acquiring a PN sequence will vary. The absolute value function can be implemented for a continuous time system with the following equation:

$$\frac{\partial x}{\partial t} = [|x(t) - x(t-15\tau)| - |x(t) + x(t+15\tau)|] - x(t)$$

The absolute value function can be implemented for a discrete time system with the following equation:

$$x(t+\tau)=|x(t)-x(t-15\tau)|-|x(t)+x(t-15\tau)|$$

The equations above correspond to a two-tap, 15-bin Absolute Value AFSR. The equations generally indicate that a second input to the absolute value function is delayed by a period fifteen times as long as a first input to the absolute value function. The equations may easily be modified for an Absolute Value AFSR with a different delay relationship between its input by replacing the 15's with a desired integer. Further, those of ordinary skill in the art can straightforwardly modify either of the above equations to suit an application in which additional inputs are employed.

Although the absolute value function has the required characteristics, additional criteria should be considered. For example, the fact that the absolute value function in FIG. 5 does not have a zero slope at all of the vertices corresponding to the binary integer values of the mod 2 addition function of an LFSR, (x,y)=(0,0), (1,0), (0,1), and (1,1), may be problematic. The result of the non-zero slope at the vertices may be that absolute value function will not settle down after reaching a fixed point. If the absolute value function receives x and y input values inside the range shown in FIG. 5, it will cause the output to move toward one of the fixed points. However, the absolute value function may not stop at one of the vertices. It may instead continue toward infinity or negative infinity depending on the original input. Similarly, if the function receives x and y input values outside the range shown in FIG. 5, it may cause the output to move away from the fixed points indefinitely.

Bounding solution: A simple solution to this potential problem is to bound the absolute value function appropriately. The output of the absolute value function may be bounded, for example, to a positive extreme value that corresponds to the one value of the mod 2 addition function of the LFSR for all values greater than or equal to the positive extreme value and, additionally or alternatively, bounded to a negative extreme value that corresponds to the zero value of the mod 2 addition function of the LFSR for all values less than or equal to negative extreme value. When the absolute value function is scaled such that the positive extreme value is one and the negative extreme value is negative one. The following computer code sequence sets appropriate bounds for the absolute value function:

$$x(t+1)=\epsilon^*S(t)-(1-\epsilon^*\text{gain}^*[-|(x(t)-x(1))|+|(x(t)+x(1))|]$$

%% threshold cutoff
if x(t+1)≧1
 x(t+1)=1;
if x(t+1)≦-1
 x(t+1)=-1
end

In some embodiments the function may be bounded such that it produces a positive extreme value and/or a negative extreme value for input values that correspond to values between the input values for the mod 2 addition function of an the LFSR. In such embodiments, the bounding may artificially create a non-zero slope at one or more values corresponding to the binary integer values of the mod 2 addition function of the LFSR. Similarly, the bounding may artificially create a non-zero slope approaching one or more of the values corresponding to the LFSR. In determining the slope of the function for these embodiments, the slope of the function at and approaching the values that correspond to the binary integer values of the mod 2 function of an LFSR is considered to be the (non-zero) slope of the function itself and not the artificial slope imposed by the bounding.

Figure 6A:
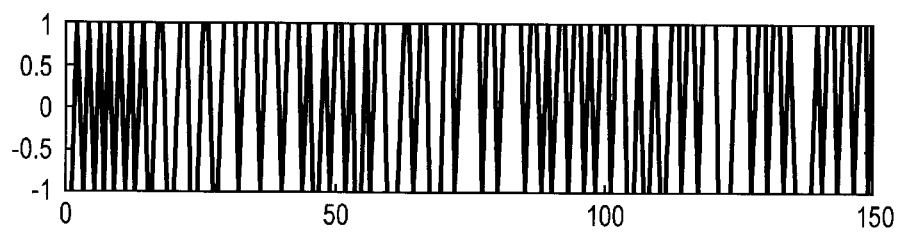
FIGS. 6A, 6B, and 6C are graphs depicting the acquisition of a pseudo-random noise signal by an illustrative system, in accordance with the present invention and characterized by an absolute value function.
Figure 6B:
Figure 6C:
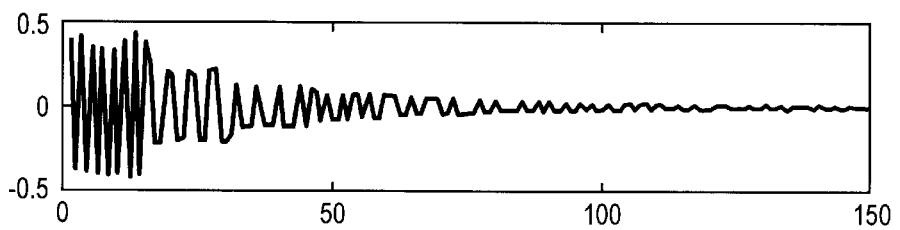

FIGS. 6A, 6B, and 6C illustrate the operation of a PN synchronizer characterized by a bounded absolute value function in acquiring a transmit signal. FIG. 6A is the transmit signal, a PN sequence. FIG. 6B is the signal generated by the Absolute Value AFSR as it acquires the transmit signal. Specifically, FIG. 6B represents a typical acquisition run for a 15-bin DT Absolute Value AFSR with no noise, ϵ=0.6, and a gain of 0.5. FIG. 6C is the difference between FIG. 6A and FIG. 6B. The smooth ring up shown in FIGS. 6A, 6B, and 6C is reminiscent of the ring up of a simple harmonic oscillator.

Figure 7:
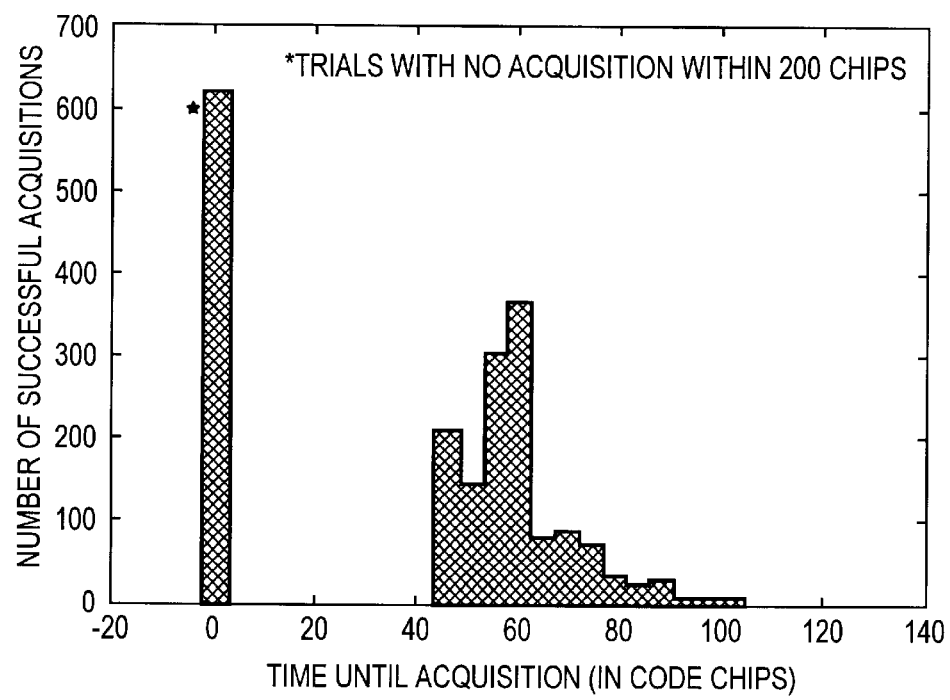
FIG. 7 is a graph depicting the distribution of signal acquisition times for an illustrative system, in accordance with the present invention and characterized by an absolute value function.

FIG. 7 illustrates the distribution of transmit signal acquisition times for a PN synchronizer characterized by an absolute value function. One thousand trials were run. A trial consisted of running a 15-bin Absolute Value AFSR for 400 chips or until it performed successful acquisition. Successful acquisition was defined as having produced 2N+1 error free chips identical to the transmit LFSR, where N is the number of bins in the register. The maximum time allowed for acquisition was 200 chips. If the AFSR failed to acquire successfully in this time, it returned a value of negative one.

More specifically, FIG. 7 is a histogram of the acquisition times for 1,000 Absolute Value AFSR acquisition trials with a noise variance of 0.5 and a gain of 1.0. The peak-to-peak signal from the LFSR transmitter had a value of one while the variance of the Gaussian additive noise was 0.5. On average, the perturbations from the noise were half as large in amplitude as the actual LFSR signal. The large peak in the FIG. 7 histogram at negative one indicates trials that failed to acquire. Accordingly, the Absolute Value AFSR did not always acquire within 200 chips. On the other hand, the distribution of acquisition times for successful trials shown in FIG. 7 suggests a Gaussian distribution. The successful trials shown in FIG. 7 also suggest that the acquisition is unimodal and well enough behaved to enable reliable predictions for the mean and variance of the acquisition time to be made. In sum, an AFSR based on an absolute value function is very well-behaved, although it may not as robust to noise as one might prefer.

Figure 8:
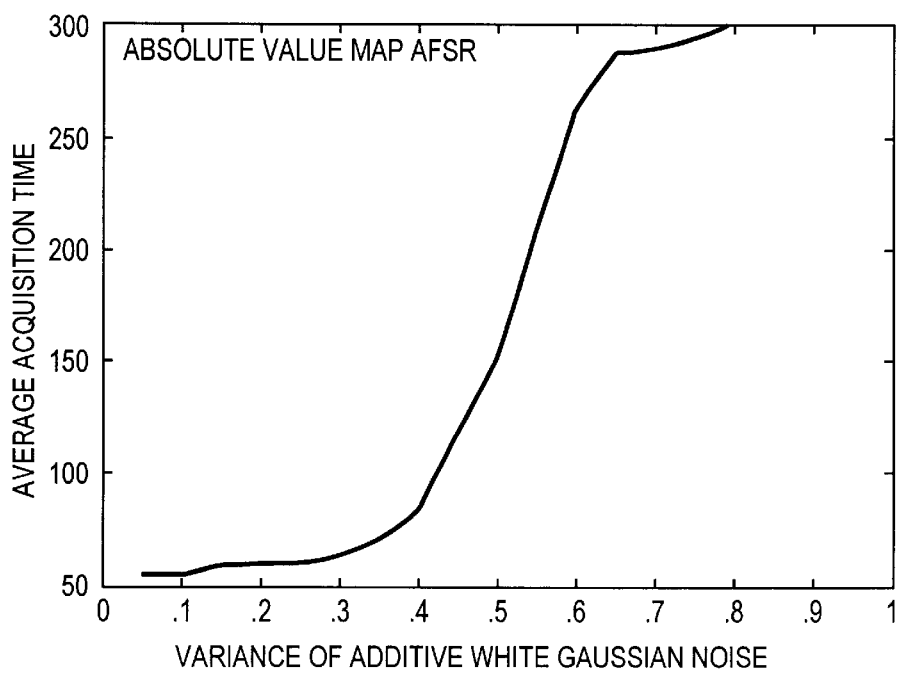
FIG. 8 is a graph that illustrates the variation of the average signal acquisition time for a system, in accordance with the present invention and characterized by an absolute value function, with respect to-the Gaussian noise in the signal.

FIG. 8 is plot of the mean acquisition time for a Absolute Value AFSR with $\epsilon=0.6$ versus a range of noise variance levels. The apparently Gaussian distribution of acquisition times in the FIG. 7 histogram support the validity of the relationship shown in FIG. 8.

Quadratic function: It has been found that quadratic functions can be used in the practice of the present invention. The basic equation for a quadratic function follows:

$$z=(x-y)^2-(x+y)^2=-xy$$

Figure 9:
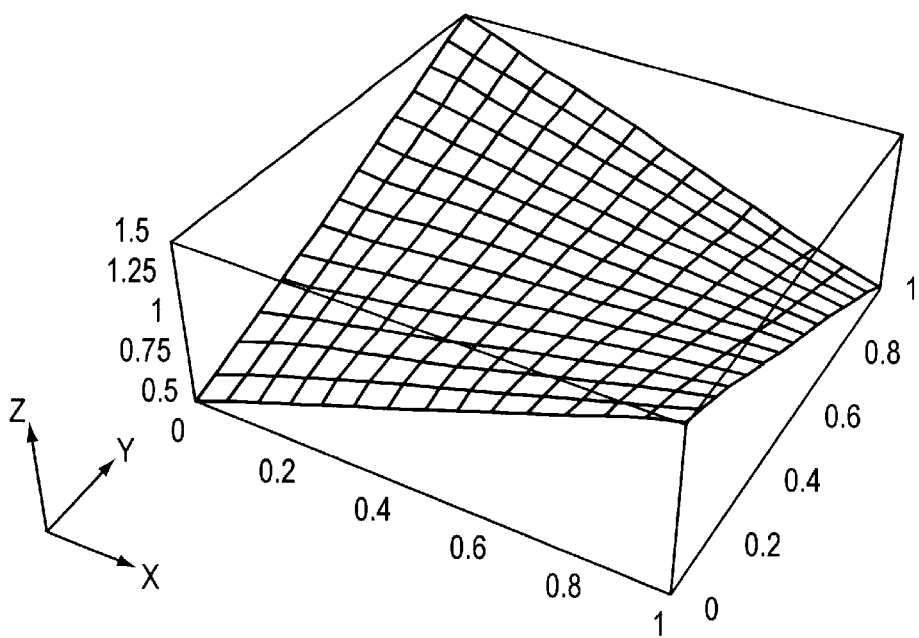
FIG. 9 is a visual representation of a quadratic function.

FIG. 9 is a visual representation of a quadratic function in which the z axis corresponds to the output of the function and the x and y axes correspond to the input of the function. The x and y values may also correspond to two taps of a shift register. FIG. 9 illustrates characteristics of the quadratic function that are of interest. For example, FIG. 9 shows that the quadratic function is continuous and smooth and that it has values that correspond to the binary integer values of a mod 2 addition function of an equivalent LFSR at the vertices of the cube. FIG. 9 further shows that the quadratic function has a non-zero slope at all of the vertices of the cube. FIG. 9 finally shows that the quadratic function has a non-zero slope between and approaching the vertices corresponding to the LFSR's binary integer values, which will cause the system to move toward those vertices as it approaches acquisition. Because the quadratic function has the required characteristics, it should be an effective non-linear function for synchronizing with a PN sequence.

The specific quadratic function that will be used as the nonlinear function for generating and, optionally, acquiring a PN sequence will vary. The quadratic function can be implemented in a continuous time system with the following equation:

$$\frac{\partial x}{\partial t}=(-x(t)\times x(t-4\tau))-x(t)$$

The quadratic function can be implemented in a discrete time system with the following equation:

$$x(t+\tau)=(x(t)-x(t-4\tau))^2-(x(t)+x(t-4\tau))^2$$

The equations above describes the function for a two-tap, 15-bin Quadratic AFSR. The equations generally indicate that a second input to the quadratic function is delayed by a period four times as long as a first input to the quadratic function. The equations can easily be modified for a Quadratic AFSR with a different delay relationship between its input by replacing the 4's with an appropriate integer.

Those of ordinary skill in the art can straightforwardly modify either of the above equations to suit an application in which additional inputs are employed. For example, the quadratic function can be implemented in a discrete time system using three inputs with the following equation:

$$x(t+\tau)=-(-x(t)\times x(t-4\tau)\times x(t-10\tau))$$

The equation above describes the function for a three-tap, 10-bin Quadratic AFSR. The equation generally indicates that the second input and the third input to the quadratic function are delayed by periods that are four and ten times as long as a the delay of the first input to the quadratic function, respectively. The equation can easily be modified for a Quadratic AFSR with a different delay relationship between its inputs by replacing the 4 and the 10 with appropriate integers.

Although the quadratic function has the required characteristics, additional criteria should be considered. For example, the fact that the quadratic function in FIG. 9, like the unbounded absolute value function, does not have a zero slope at all of the vertices corresponding to the binary integer values of the mod 2 addition function of an LFSR, (x,y)=(0,0), (1,0), (0,1), and (1,1), may be problematic. Like the unbounded absolute value function, the quadratic function may not settle down after reaching a fixed point. The quadratic function may instead continue toward infinity or negative infinity depending on the original input.

Bounding solution: A simple solution is to bound the function appropriately. The output of the quadratic function may be bounded, for example, to a positive extreme value that corresponds to the one value of the mod 2 addition function of the LFSR for all values greater than or equal to the positive extreme value and, additionally or alternatively, bounded to a negative extreme value that corresponds to the zero value of the mod 2 addition function of the LFSR for all values less than or equal to negative extreme value. When the quadratic function is scaled such that the positive extreme value is one and the negative extreme value is negative one, the following computer code sequence sets appropriate bounds for the quadratic function:

$$x(t+1)=\epsilon*S(t)-(1-\epsilon)*\text{gain}*[(x(t)*x(1)]$$

%% threshold cutoff
if x(t+1)≥1
    x(t+1)=1;
if x(t+1)≤-1
    x(t+1)=-1;
end

In some embodiments the function may be bounded such that it produces a positive extreme value and/or a negative extreme value for input values that correspond to values between the input values for the mod 2 addition function of an the LFSR. These embodiments are not limited to embodiments in which the function is an absolute value function or a quadratic function. In such embodiments, the bounding may artificially create a non-zero slope at one or more values corresponding to the binary integer values of the mod 2 addition function of the LFSR. Similarly, the bounding may artificially create a non-zero slope approaching one or more of the values corresponding to the LFSR. In determining the slope of the function for these embodiments, the slope of the function at and approaching the values that correspond to the binary integer values of the mod 2 function of an LFSR is considered to be the slope of the function itself and not the artificial slope imposed by the bounding.

Figure 10:
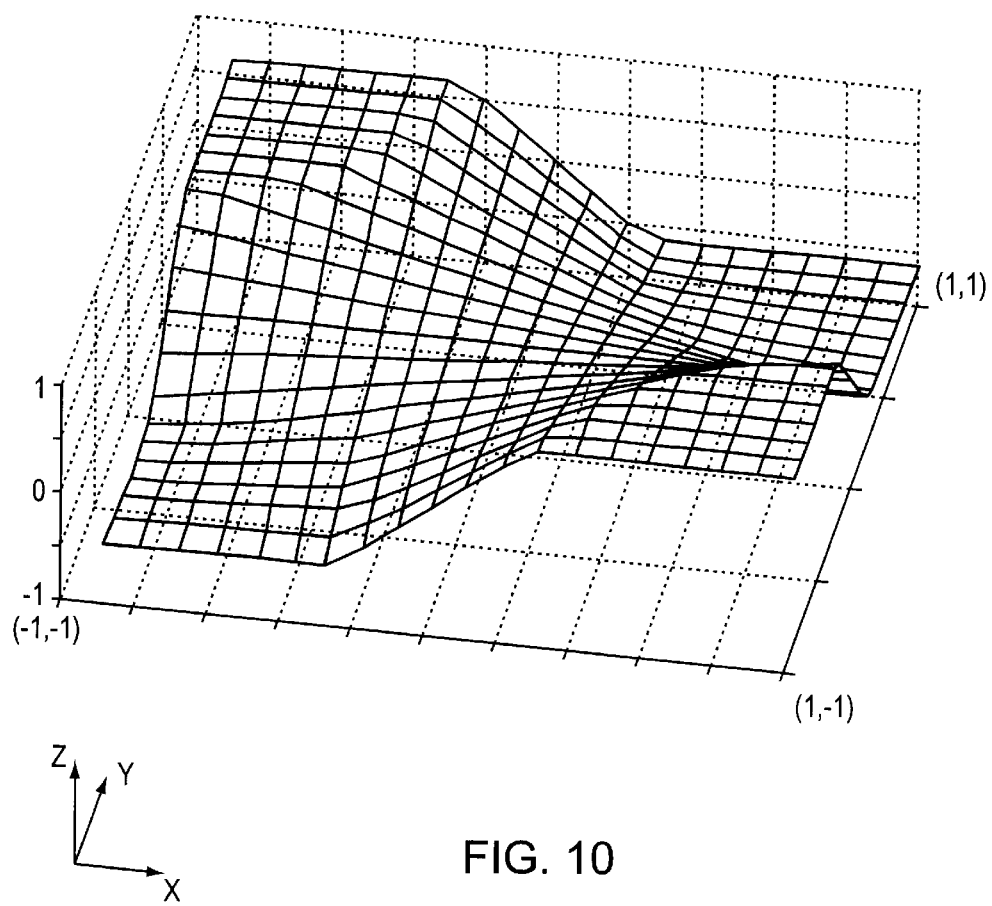
FIG. 10 is a visual representation of a bounded quadratic function.

FIG. 10 illustrates a bounded quadratic function that illustrates the artificial slope problem. Again the x and y axes correspond to input to the quadratic function. These values may be representative of the two taps of the shift register. The z axis corresponds to the output of the quadratic function. Clearly, if the artificial slope created by bounding is discounted; the slope of function illustrated in FIG. 10 is non-zero at values corresponding to the binary integer values of the mod 2 addition function of an LFSR and approaching those values.

The quadratic function differs from the absolute value function in interesting ways. The consistent slope of the absolute value function will causes the AFSR to migrate toward a fixed point at a consistent rate. The quadratic function, on the other hand, has a slope that is shallow in the center but that becomes steeper toward the vertices corresponding to the binary integer values of the mod 2 addition function of an LFSR. Accordingly, the quadratic function will cause the AFSR to slowly migrate toward the vertices at first as it explores the phase space trying to acquire the LFSR signal. As the certainty of acquisition rises, however, the Quadratic AFSR will accelerate toward acquisition. The Grinstein et al. approach sought to achieve this feature by scheduling epsilon. In contrast, an approach based on the quadratic function achieves the feature by exploiting the very nature of the function. The Grinstein et al. approach risked not lingering long enough at uncertain values to find the correct phase of the incoming PN sequence whereas the quadratic function approach allows the gain to be turned up without causing as much incorrect phase matching. Increased gain on a quadratic function will primarily effect the quadratic map at the edges, near the vertices where steep slope is most beneficial.

Figure 11:
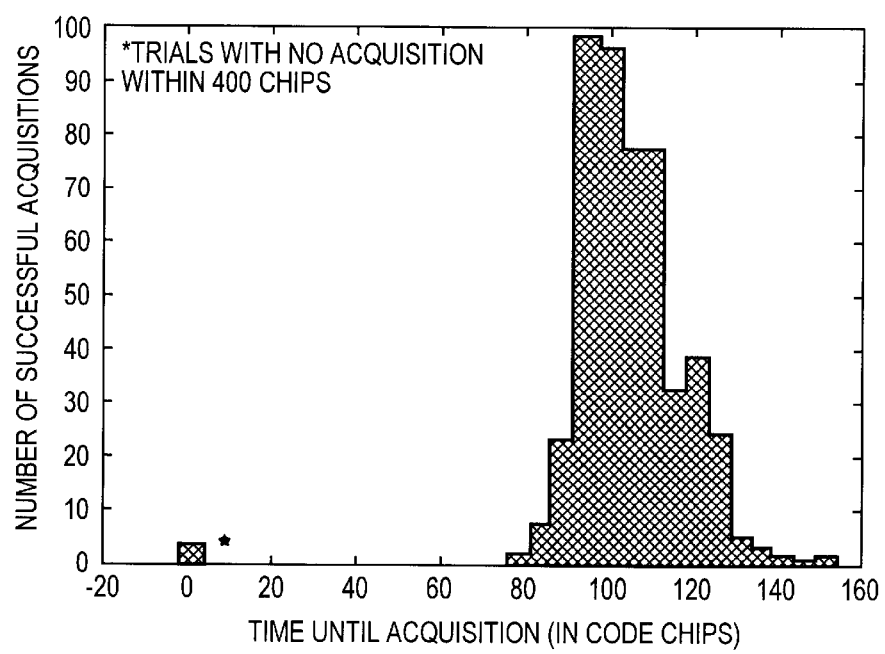
FIG. 11 is a graph depicting the distribution of signal acquisition times for an illustrative system, in accordance with the present invention and characterized by a quadratic function and a small epsilon value.
Figure 12:
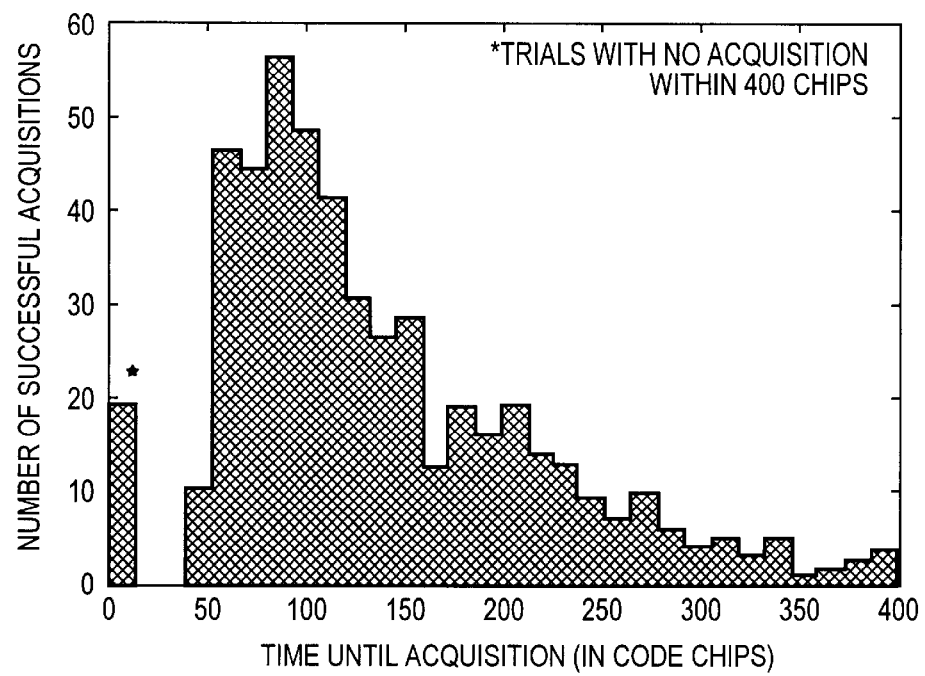
FIG. 12 is a graph depicting the distribution of signal acquisition times for an illustrative system, in accordance with the present invention and characterized by a quadratic function and a large epsilon value.

FIGS. 11 and 12 are graphs depicting the distribution of transmit signal acquisition times for PN synchronizers characterized by an quadratic function. As was done for the Absolute Value AFSR, 1,000 trials were run of a 15-bin discrete time Quadratic AFSR. A trial consisted of running a 15-bin Quadratic AFSR for 400 chips or until it performed successful acquisition. Successful acquisition was again defined as having produced 2N+1 error free chips identical to the transmit LFSR, where N is the number of bins in the register. The maximum time allowed for acquisition was 200 chips. Again, if the AFSR failed to acquire successfully in this time, it returned a value of negative one.

FIG. 11 is a histogram of the acquisition times for 1,000 discrete time Quadratic AFSR acquisition trials with a noise variance of 0.5 and $\epsilon=0.1$. FIG. 12 is a similar histogram in which $\epsilon=0.8$. FIGS. 11 and 12 plot the number of successful acquisitions in the trial against each acquisition time in chips. FIGS. 11 and 12 show that the Quadratic AFSR usually acquired the PN sequence within 200 chips. The successful trials shown in FIGS. 11 and 12 have a nice distributions of acquisition times that suggest a unimodal acquisition. The distributions for both epsilon values also appear Gaussian. The distributions are well enough behaved to suggest that reliable predictions for the mean and variance of the acquisition time can be made. FIGS. 11 and 12 suggest that smaller epsilon values result in a narrower distribution of acquisition times and a longer mean acquisition time. Similarly, FIGS. 11 and 12 suggest that larger epsilon values result in a wider distribution of acquisition times and a shorter mean acquisition time. In sum, an AFSR based on a quadratic function is very well-behaved.

Figure 13:
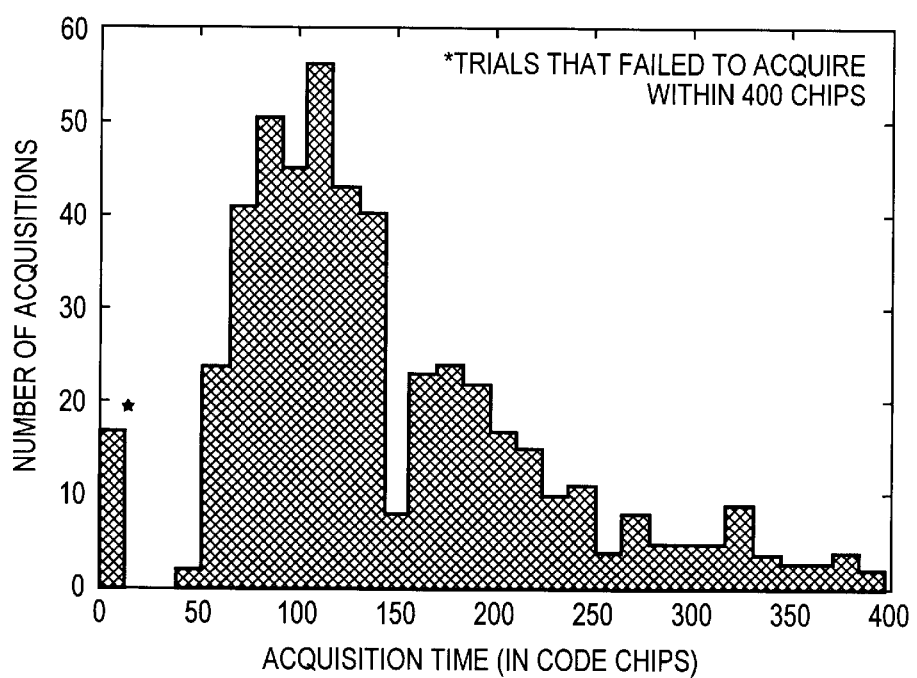
FIG. 13 is a graph depicting the distribution of signal acquisition times under extreme noise conditions for an illustrative system, in accordance with the present invention and characterized by a quadratic function.

FIG. 13 is a histogram of the acquisition times for 1,000 discrete time Quadratic AFSR acquisition trials with a noise variance of 1.0 and $\epsilon=0.6$. FIG. 13 plots the number of successful acquisitions in the trial against each acquisition time in chips. FIG. 13 shows that the Quadratic AFSR usually acquired the PN sequence within 200 chips even when the variance of the noise is of equal magnitude to the received PN sequence signal. Even with the high noise value, the distribution remains smooth and unimodal.

Figure 14:
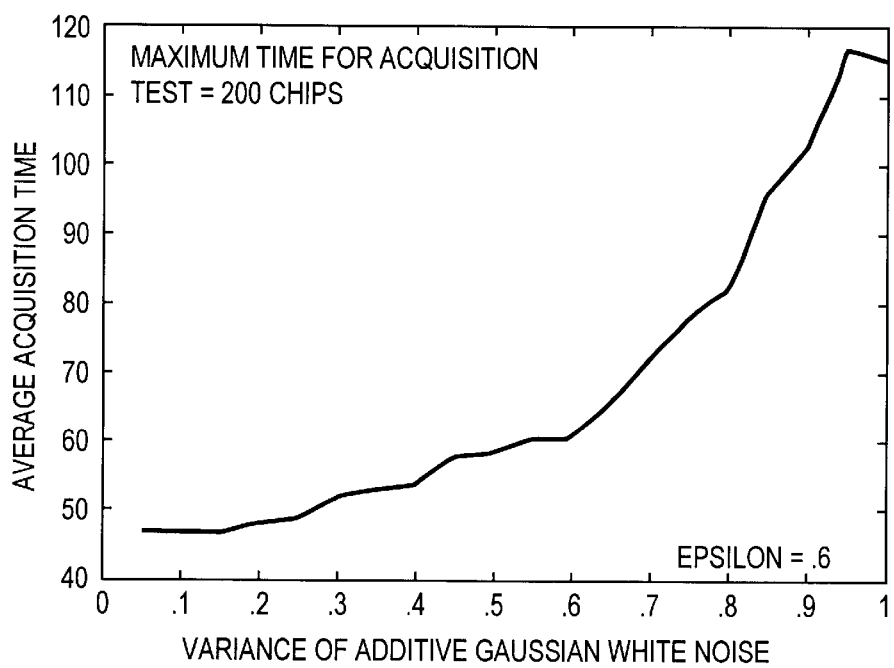
FIG. 14 is a graph that illustrates the variation of the average signal acquisition time for a system, in accordance with the present invention and characterized by a quadratic function, with respect to the Gaussian noise in the signal.

FIG. 14 is plot of the mean acquisition time for a Quadratic AFSR with $\epsilon=0.6$ against various noise variance levels. The apparently Gaussian distribution of acquisition times with various epsilon values support the validity of the relationship shown in FIG. 14.

Hardware Overview.

Figure 15:
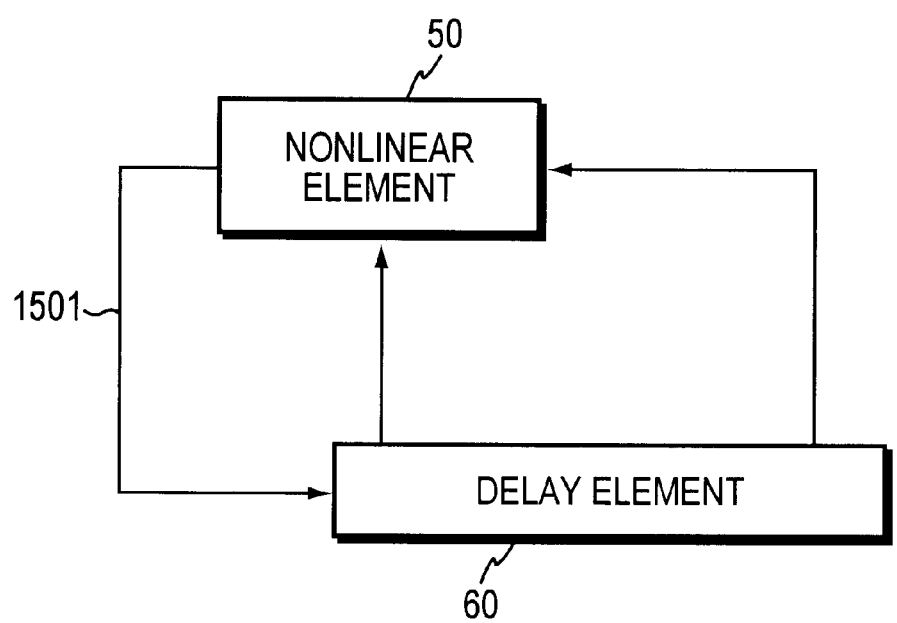
FIG. 15 is a diagram of apparatus for generating a pseudo-random noise signal that embodies the present invention.

Some embodiments implement the present invention in hardware. Such an embodiment can be described as an apparatus for generating a pseudo-random noise sequence. As illustrated in FIG. 15, the apparatus comprises a delay element 60, a nonlinear element 50, and a feedback connection 1501. The delay element 60 delays the actuating signal, which it receives as input, by a first period to produce a first delayed actuating signal. The delay element 60 also delays the actuating signal by a second period to produce a second delayed actuating signal. The nonlinear element 50 applies a continuous, nonlinear function to a first input that corresponds to the first delayed actuating signal and a second input that corresponds to the second delayed actuating signal to produce an output signal. The function that the nonlinear element 50 applies has values that correspond to the binary integer values of a mod 2 addition function of a linear feedback shift register. It also has a non-zero slope at those values. The feedback connection 1501 between the nonlinear element 50 and the delay causes the output signal to become a pseudo-random noise signal over time.

Delay: In a delay element arrangement in accordance with the present invention, the second period of delay is approximately an integer multiple of the first period of delay. Although deviation from an exact integer multiple degrades performance, some deviation and the resulting suboptimal performance is often acceptable as a practical matter. Those of skill in the art can straightforwardly determine the tolerable deviation for a particular application.

Figure 16:
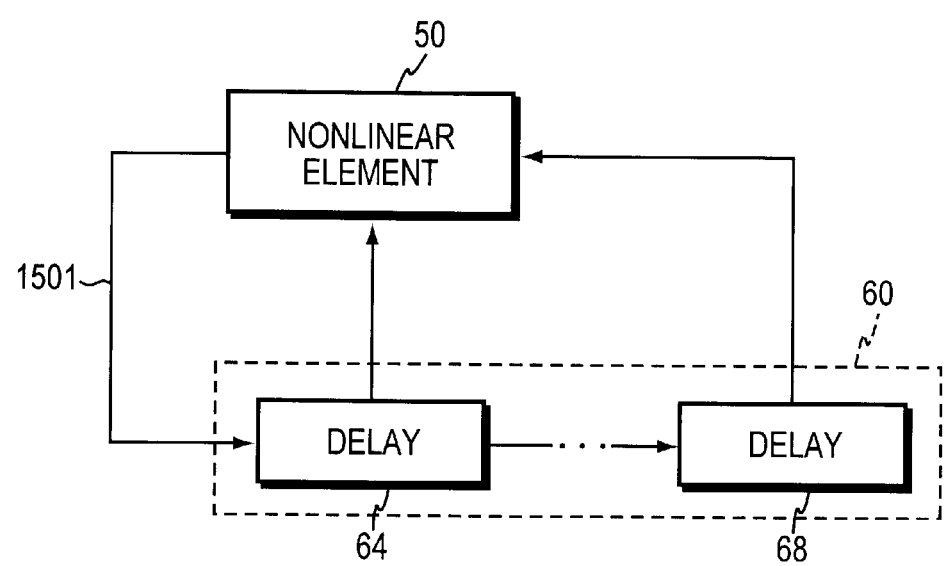
FIG. 16 is a diagram of apparatus for generating a pseudo-random noise signal that illustrates one embodiment of the delay element in accordance with the present invention.
Figure 17:
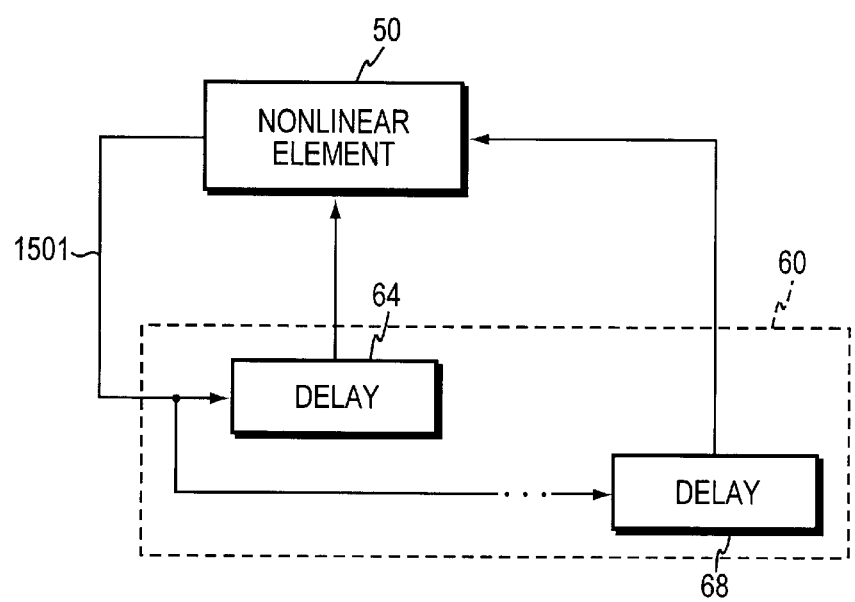
FIG. 17 is a diagram of apparatus for generating a pseudo-random noise signal that illustrates a second embodiment of the delay element in accordance with the present invention.

Several alternative delay element 60 arrangements are equivalent and within the scope of the invention. The first and second delay periods in each of the equivalent arrangements may correspond to the delay periods created by the tap placement in a conventional LFSR. FIG. 15 may represent, for example, a single delay element that is tapped in two different places to create the first delayed actuating signal and the second delayed actuating signal. FIGS. 16 and 17 illustrate equivalent, alternative delay elements that further comprise a first delay element and a second delay element.

In particular, FIG. 16 illustrates a delay element 60 arrangement in which the actuating signal is delayed by the first delay element 64 and the resulting first delayed actuating signal is communicated to a second delay element 68. A first input that corresponds to the first delayed actuating signal is communicated to the nonlinear element 50. The second delay element 68 in FIG. 16 further delays the first delayed actuating signal to produce a second delayed actuating signal. The second delay element 68 may further comprises additional delay elements. For example, an apparatus designed to work with a two-tap 15-bin linear feedback shift register may have fifteen delay elements in series. In this example, the first delayed actuating signal may be produced by tapping the first delay element 64 in the series. A first input that corresponds to the first delayed actuating signal is communicated to the nonlinear element 50. The second delayed actuating signal may be produced by tapping the fifteenth delay element in the series. A second input that corresponds to the second delayed actuating signal is also communicated to the nonlinear element 50.

FIG. 17 illustrates a delay element 60 arrangement in which the actuating signal is split. The same actuating signal is then simultaneously communicated in parallel to the first delay element 64 and to the second delay element 68. FIG. 17 operates like the delay arrangement illustrated in FIG. 16 except that the second delay element 68 is not in signal communication with the first delay element 64. Instead the second delay element 68 independently receives the same actuating signal that the first delay element 64 receives. Again, the second delay element 68 may further comprise additional delay elements. For example, an apparatus designed to work with a two-tap 15-bin linear feedback shift register may have sixteen delay elements, fifteen of which are in series. In the example, the first delayed actuating signal may be produced by tapping the delay element not in the series and the second delayed actuating signal may be produced by tapping the fifteenth delay element in the series.

Nonlinear element: The function that the nonlinear element 50 applies may be such that it has a non-zero slope approaching the values that correspond to the binary integer values of the mod 2 addition function of an LFSR. It may be such that it has a non-zero slope when the first input equals the second input (i.e., $y=x$) and, alternatively or additionally, when the first input equals the negative of the second input plus a constant (i.e., $y=-x+C$). The nonlinear element 50 may apply a function that approximates a quadratic function. The nonlinear element 50 may apply a quadratic function. Such a nonlinear element 50 may comprise an analog multiplier or a double balanced mixer. The nonlinear element 50 may similarly apply an absolute value function.

In some embodiments, the nonlinear element 50 may bound the function that it applies. For example, the output signal may be set to a positive extreme value that corresponds to a one value of the mod 2 addition function of an LFSR whenever it is greater than or equal to the positive extreme value, and, alternatively or additionally, the output signal may be set to a negative extreme value that corresponds to a zero value of the mod 2 addition function of an LFSR whenever it is less than or equal to the negative extreme value. Specifically, if the function is scaled such that the positive extreme value is one and the negative extreme value is negative one, then the output signal may be set to one whenever it is greater than or equal to one (e.g., if $z \geq 1$, then $z=1$) and the output signal may be set to negative one whenever it is less than or equal to negative one (e.g., if $z \leq -1$, then $z=-1$). In determining the slope of the function, the artificial slope imposed by bounding the function (such that it produces a positive extreme value and/or a negative extreme value for input values that correspond to values between the input values for the mod 2 addition function of an the LFSR) is not considered to be the slope of the function.

In bounded embodiments, the nonlinear element 50 may comprise a gain element that clips the function appropriately. Such a gain element, which may be a dual supply gain, produces the output signal by clipping the signal it received from the function. Where a separate gain element is a component of the nonlinear element 50, the function applied by the nonlinear element 50 need only have the required characteristics within the allowed bounds of output signal.

Feedback connection: As previously stated, the feedback connection 1501 between the nonlinear element 50 and the delay causes the output signal to become a pseudo-random noise signal over time. In apparatus designed to generate a PN sequence, the feedback connection 1501 may comprise a direct connection between the nonlinear element 50 and the delay element 60 of FIG. 15. With the direct connection, the output signal may be the actuating signal.

In some embodiments of the apparatus, the delay element produces more than two delayed actuating signals. The delay period associated with each additional delayed actuating signal is approximately an integer multiple of the first period. In these embodiments, an input corresponding to each delayed actuating signal is applied to a nonlinear element. Additional nonlinear elements will be required to accommodate the additional inputs. Each additional nonlinear element will produce an output signal, and will have values that correspond to the binary integer values of the mod 2 addition function of an LFSR and a non-zero slope at those values. Further, each nonlinear will be matched with two inputs, each of which will correspond to a delayed actuating signal or to an output signal. A single output signal will be communicated to the delay element, whereby it will become a pseudo-random noise signal over time. The additional nonlinear elements and their associated inputs may be considered components of the feedback connection. For clarity in these embodiments, the nonlinear element 50 shown in FIG. 15 is known as the first nonlinear element and is said to produce a first output signal.

Figure 18:
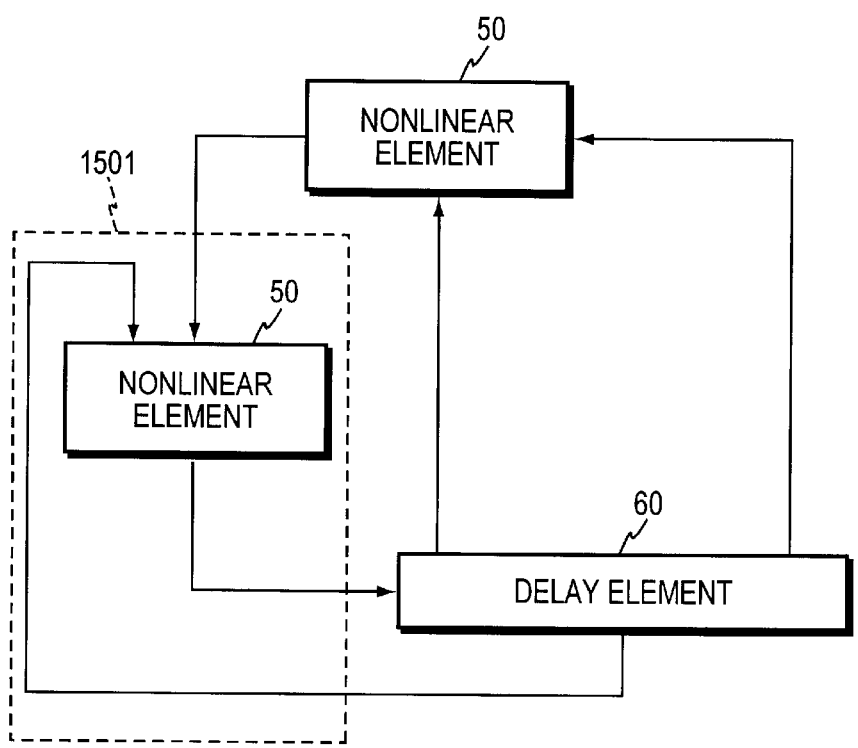
FIG. 18 is a diagram of apparatus for generating a pseudo-random noise signal in which the delay element produces a third delayed actuating signal in accordance with the present invention.

FIG. 18 illustrates an exemplary embodiment of the apparatus in which the delay element creates a first, a second, and a third delayed actuating signal. The first nonlinear element 50 applies a first function to a first input that corresponds to the first delayed actuating signal and a second input that correspond to the second delayed actuating signal to produce the first output signal. A second nonlinear element 50 applies a second function to a third input that corresponds to the first output signal and a fourth input that correspond to the third delayed actuating signal to produce the second output signal. The second nonlinear element 50 may be considered part of the feedback connection 1501. The second output signal will be communicated to the delay element, whereby the second output signal becomes a pseudo-random noise signal over time.

Figure 19:
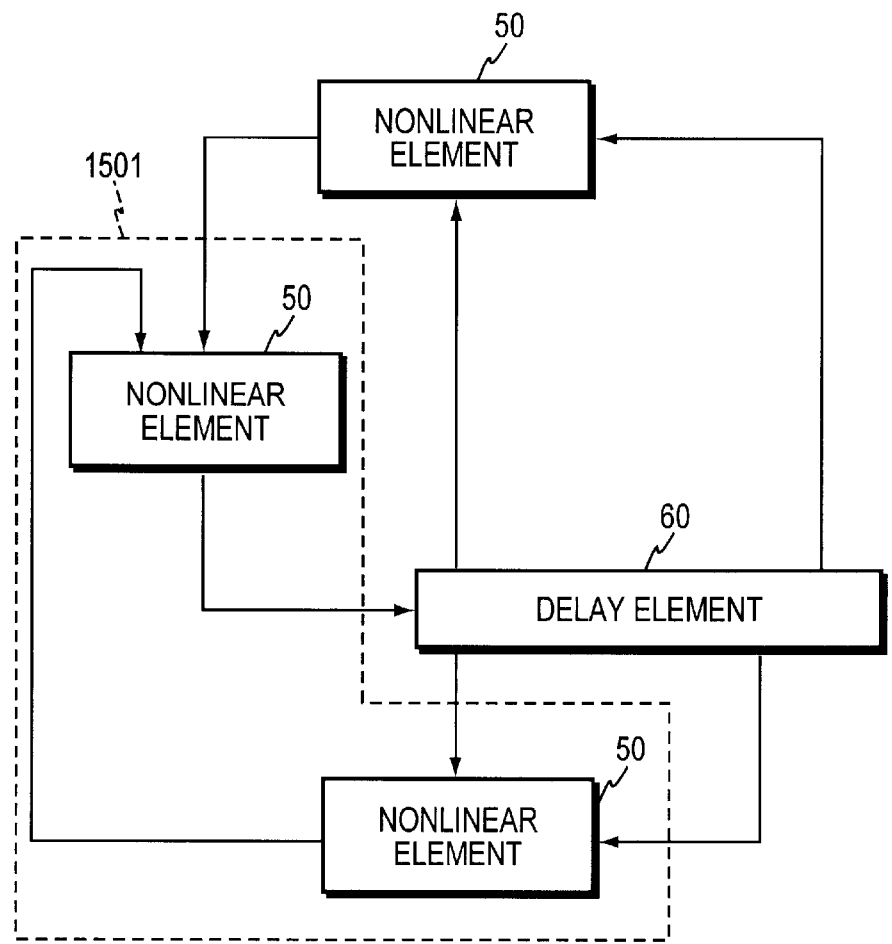
FIG. 19 is a diagram of apparatus for generating a pseudo-random noise signal in which the delay element produces a third and fourth delayed actuating signal in accordance with the present invention.

FIG. 19 illustrates an exemplary embodiment of the apparatus in which the delay element creates a first, a second, a third, and a fourth delayed actuating signal. The first nonlinear element 50 applies a first function to a first input that corresponds to the first delayed actuating signal and a second input that corresponds to the second delayed actuating signal to produce the first output signal. A second nonlinear element 50 applies a second function to a third input that corresponds to the third delayed actuating signal and a fourth input that corresponds to the fourth delayed actuating signal to produce the second output signal. A third nonlinear element 50 applies a third function to a fifth input that corresponds to the first output signal and a sixth input that corresponds to the second output signal to produce the third output signal. The second and third nonlinear elements 50 may be considered part of the feedback connection 1501. The third output signal will be communicated to the delay element, whereby the third output signal becomes a pseudo-random noise signal over time.

Figure 20:
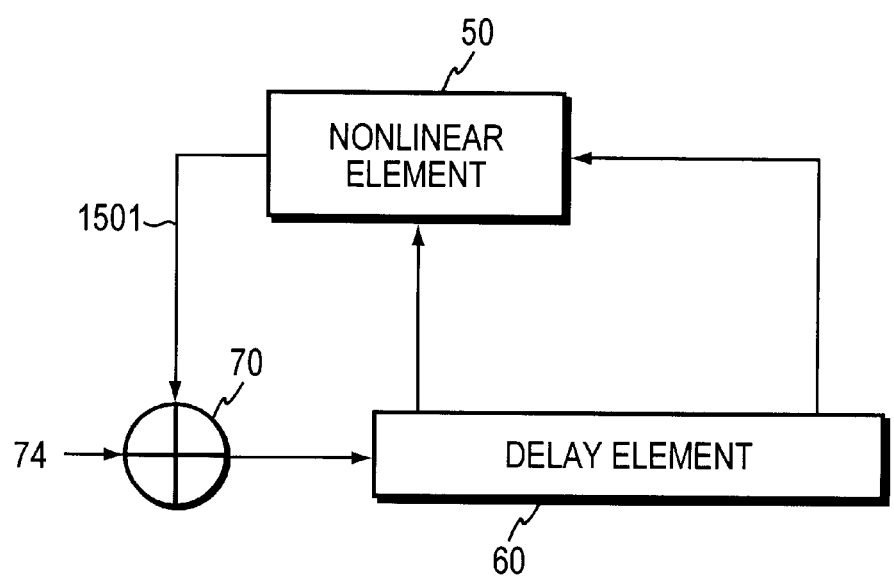
FIG. 20 is a diagram of apparatus for generating a pseudo-random noise signal, in accordance with the present invention, that may be used to acquire a pseudo-random noise signal.

In apparatus designed to acquire a PN sequence, the feedback connection 1501 generally also comprises an adder 70 between the nonlinear element 50 and the delay element 60 as illustrated in FIG. 20. In embodiments that have a plurality of nonlinear elements, the adder will be in signal communication with the nonlinear element that produces the single output signal that is communicated to the delay element and with the delay element. The adder allows a reference input signal 74 to be introduced into the apparatus. The adder will be in signal communication with the delay element, the nonlinear element 50, and any reference input signal that is introduced. When a reference input signal is introduced, the adder superposes the output signal on the reference input signal to produce the actuating signal. This feedback connection 1501 causes the output signal to acquire the reference input signal over time. Apparatus that includes the adder 70, as illustrated in FIG. 20, may behave like the apparatus illustrated in FIG. 15 until a reference input signal is introduced.

Continuous time: Some embodiments of the invention are continuous time apparatus. A continuous time apparatus may use the first delayed actuating signal as the first input and the second delayed actuating signal as the second input.

Figure 21:
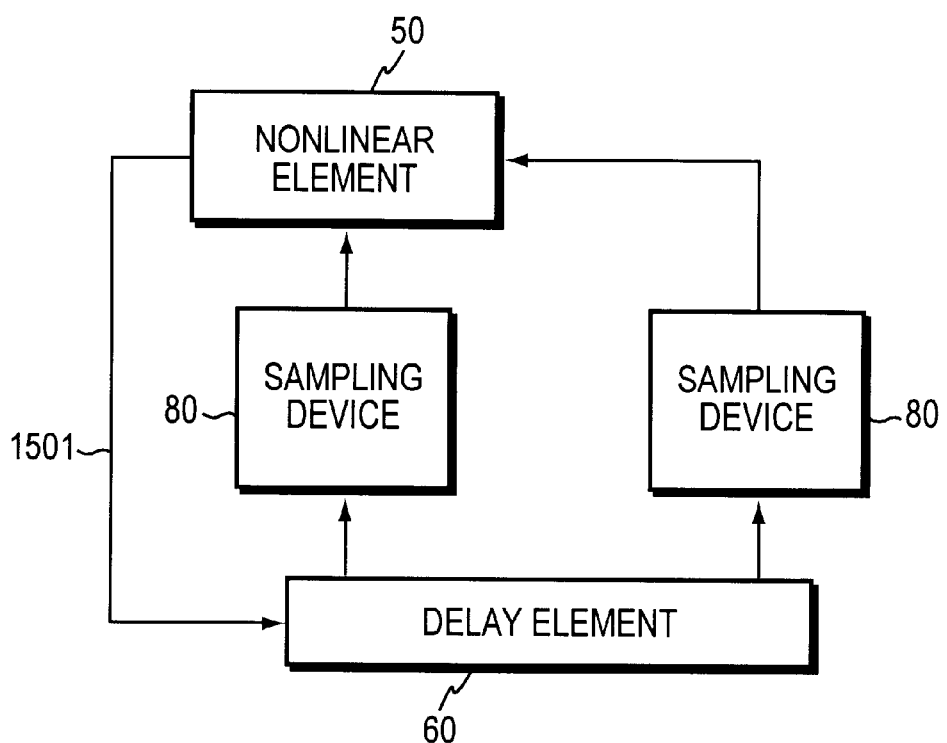
FIG. 21 is a diagram of a discrete time apparatus for generating a pseudo-random noise signal, in accordance with the present invention.

Discrete time: Other embodiments of the invention are discrete time apparatus. A discrete time apparatus requires a sampling device for delay actuating signal produced by the delay element. Accordingly, as illustrated in FIG. 21, a discrete time apparatus may further comprises two sampling devices, which each convert a continuous time signal into a train of digital values (a "sample" ). The first sampling device 80 is in signal communication with the first delayed actuating signal from the delay element 60. It samples the first delayed actuating signal to produce a sample that is used as the first input to the nonlinear element 50. Similarly, the second sampling device 80 is in signal communication with the second delayed actuating signal from the delay element 60. It samples the second delayed actuating signal to produce a sample that is used as the second input to the nonlinear element 50.

Figure 22:
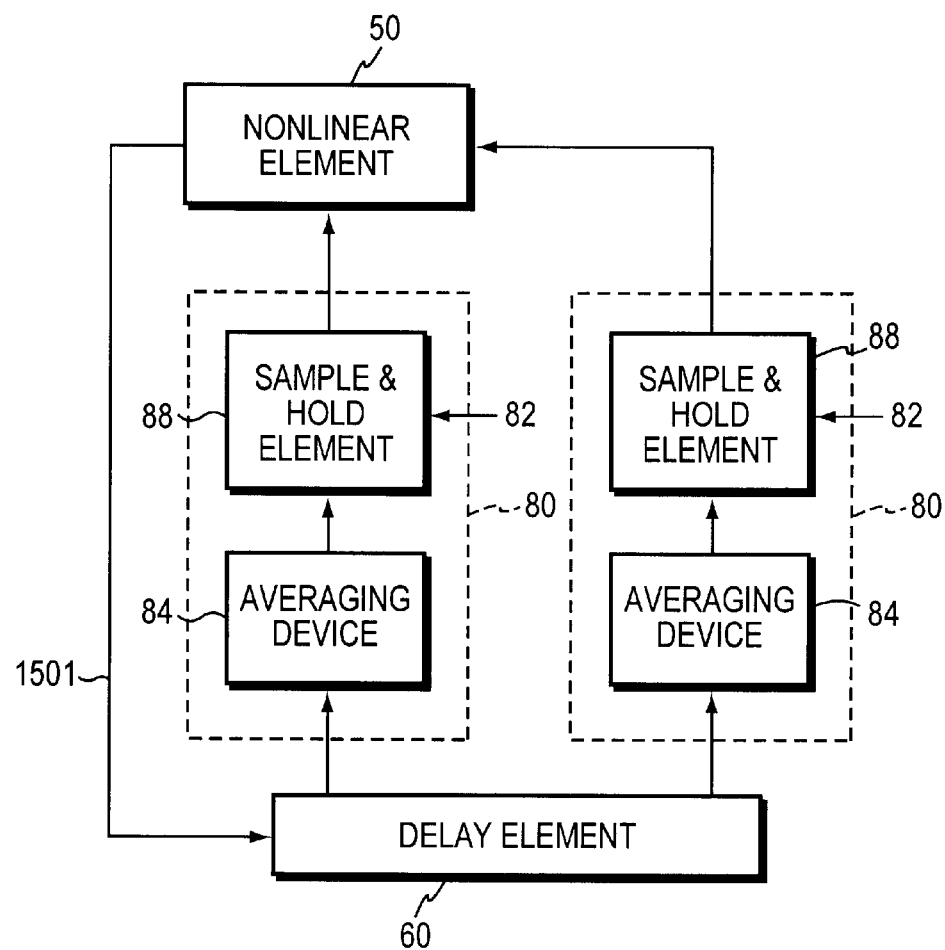
FIG. 22 is a diagram of one detailed embodiment of a discrete time apparatus for generating a pseudo-random noise signal, in accordance with the present invention.

FIG. 22 illustrates an embodiment of FIG. 21 in which each sampling device 80 further comprises a low pass filter 84 and a sample and hold element 88. The low pass filter 84 of the first sampling device 80 produces a first signal average by averaging the first delayed actuating signal. The sample and hold element 88 of the first sampling device 80 produces the first input by sampling the first signal average. Similarly, with respect to the second sampling device 80, the low pass filter 84 produces a second signal average, and the sample and hold element 88 produces the second input. Each sample and hold element 88 may rely on the signal 82 from an oscillator to trigger its operation.

Figure 23:
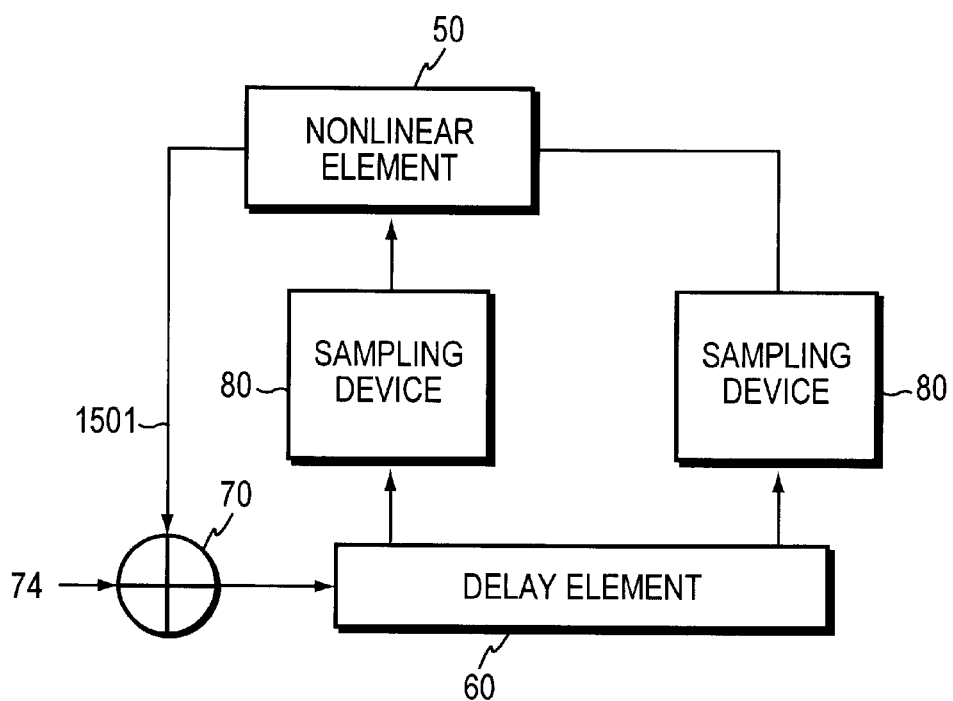
FIG. 23 is a diagram of a discrete time apparatus for generating a pseudo-random noise signal, in accordance with the present invention, that may be used to acquire a pseudo-random noise signal.

FIG. 23 illustrates an embodiment of FIG. 21 that further comprises two sampling devices 80 arranged in parallel. FIG. 23 is similar to FIG. 21 except that the adder 70 allows a reference input signal 74 to be introduced and enables the apparatus to acquire the reference input signal 74. If the nonlinear element 50 applies a bounded absolute value function, the apparatus of FIG. 23 is consistent with that used to produce the results illustrated by FIGS. 6, 7, and 8. If the nonlinear element 50 of applies a bounded quadratic finction, the apparatus of FIG. 23 is consistent with that used to produce the results illustrated by FIGS. 11, 12, 13, and 14.

Figure 24:
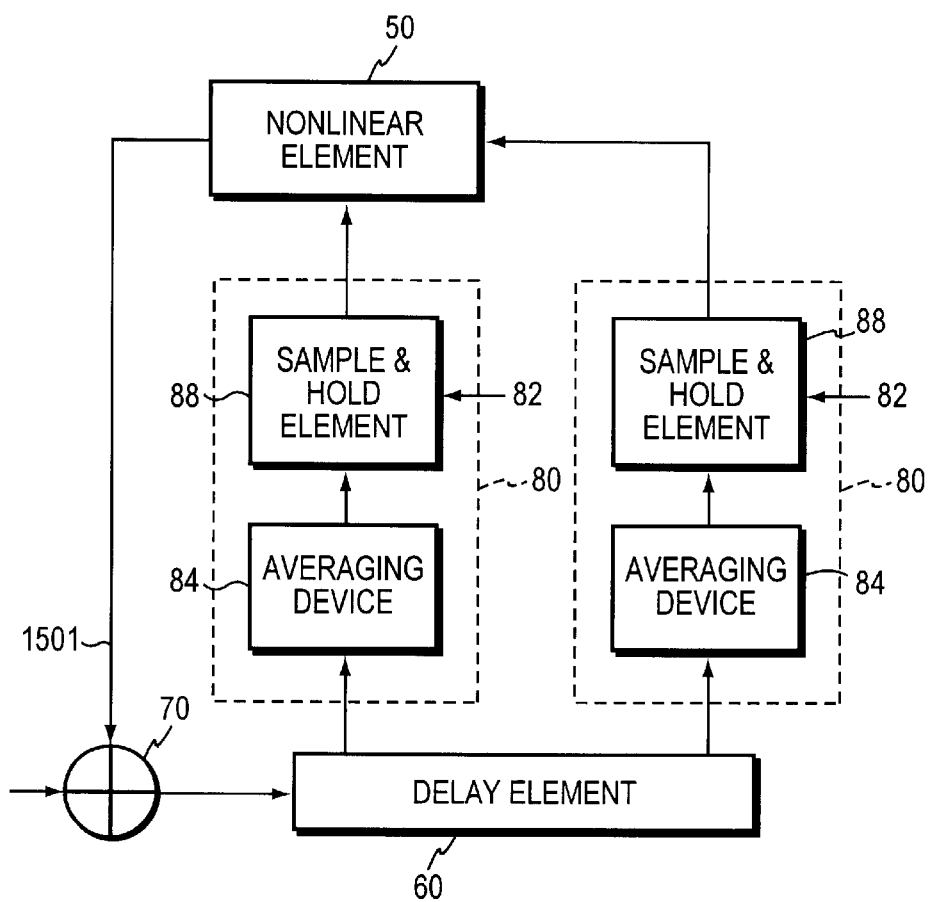
FIG. 24 is a diagram of one detailed embodiment of a discrete time apparatus for generating a pseudo-random noise signal, in accordance with the present invention, that may be used to acquire a pseudo-random noise signal.

FIG. 24 illustrates an embodiment of FIG. 23 in which each sampling device 80 further comprises a low pass filter 84 and a sample and hold element 88. Each sample and hold element 88 in FIG. 24 may rely on the signal 82 from an oscillator to trigger its operation. Alternatively, each sample and hold element 88 in FIG. 24 may rely on a chip clock signal 82 that corresponds to the reference input signal. If a chip clock signal 82 is used, both sample and hold elements 88 may rely on the same chip clock signal 82. The chip clock signal 82 may be generated by a phase locked loop (not shown) in signal communication with the output signal or the reference input signal. A chip clock signal 82 generated by a phase locked loop in signal communication with the output signal or the reference input signal may be based on the derivative of either signal. A chip clock signal 82 may alternatively be received via a sideband carrier of the reference input signal.

Figure 25:
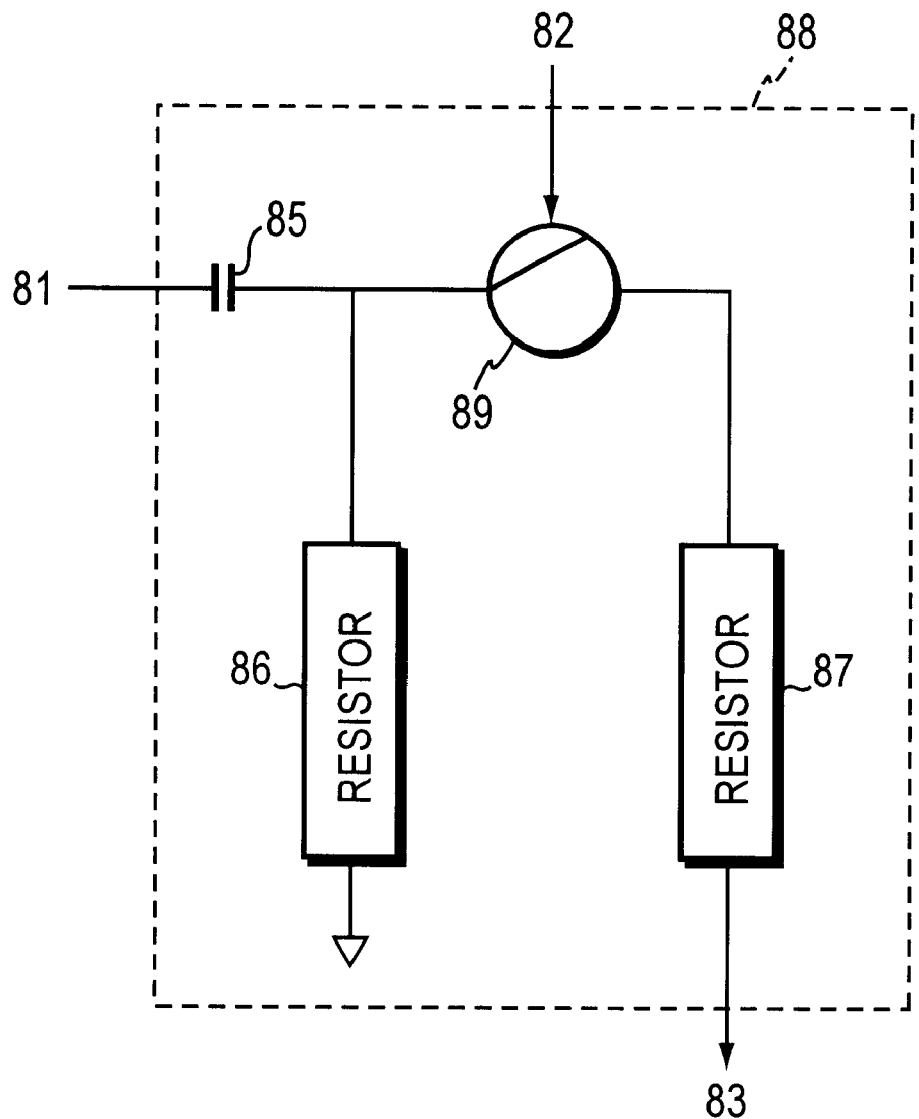
FIG. 25 is a diagram of a sample and hold from prior art that may be used in a discrete time apparatus for generating a pseudo-random noise signal, in accordance with the present invention.

FIG. 25 illustrates an exemplary sample and hold element 88 that may be used, for example, in the embodiments illustrated by FIGS. 6 or 8. The sample and hold element 88 illustrated in FIG. 25 comprises a small capacitor 85, a large resistive element 86, a switch 89 controlled by a chip clock signal 82, and a small resistive element 87. The operation of the sample and hold element 88, that is a component of the sampling device 80 that receives the first delayed actuating signal from the delay element 60, will be described. The low pass filter 84 (see FIG. 22 or 24) communicates a first signal average 81 to the sample and hold element 88 as input. Normally, the switch 89 is open. While the switch 89 is open, the large resistive element 86 allows the small capacitor 85 to slowly build up and/or discharge voltage from the first signal average 81. Once per chip, the chip clock signal 82 drives the switch 89 to close for a portion of a chip period. The capacitor 85 then drains its stored voltage through the small resistive element 87 to produce the first input to the nonlinear element 50. The sample and hold element 88 thereby produces a first input that is an average value for the chip. The chip clock signal 82 closes the switch 89 at one phase in the chip cycle. The switch may close shortly before the chip changes. Although sampling at a different phase in the chip cycle degrades performance, some deviation and the resulting suboptimal performance is often acceptable as a practical matter. Those of skill in the art can straightforwardly determine the tolerable deviation for a particular application. Further, the phase may be adjusted to improve the sampling.

In embodiments that generate a pseudo-random noise signal, the apparatus may be the PN generator 24 of a transmitter 20 as illustrated in FIG. 1. Such a transmitter 20 may further comprise a modulator 28 that modulates the pseudo-random noise signal with a message signal. The modulated pseudo-random noise signal may be transmitted as a transmit signal. The transmit signal may become corrupted and/or attenuated before reaching a receiver 30.

In embodiments that may acquire a reference input signal, the apparatus may be a PN synchronizer 34 of a receiver 30 as illustrated in FIG. 1. Such a receiver 30 may synchronize with a reference input signal that is a pseudo-random noise signal modulated with a message signal. Such a receiver may also synchronize with a reference input signal that is an unmodulated pseudo-random noise signal. The reference input signal may be corrupted and/or attenuated. A receiver 20 comprising the PN synchronizer 34 may further comprise a demodulator 38 to recover a message signal from the reference input signal.

In embodiments that receive a reference input signal, the chip clock signal 82 for any sample and hold elements 88 may be derived from the reference input signal. For example, as previously stated, it may be generated by a phase locked loop in signal communication with the output signal or the reference input signal. The chip clock signal 82 may be based on the derivative of either signal. Such a phase locked loop may cause the phase of chip cycle in which the sampling is performed to move toward the phase that will result in optimal system performance.

The transmitter 20 and/or receiver 30 described above may further be part of a spread spectrum communication system 10 as illustrated FIG. 1. In some embodiments of the communication system 10, the transmitter 20 comprises a linear feedback shift register as its PN generator 24 while the receiver 30 comprises a PN synchronizer 34 in accordance with the present invention. In other embodiments of the communication system 10, the transmitter 20 comprises a PN generator 24 in accordance with the present invention and the receiver 30 comprises a PN synchronizer 34 in accordance with the present invention.

Method Overview.

Figure 26:
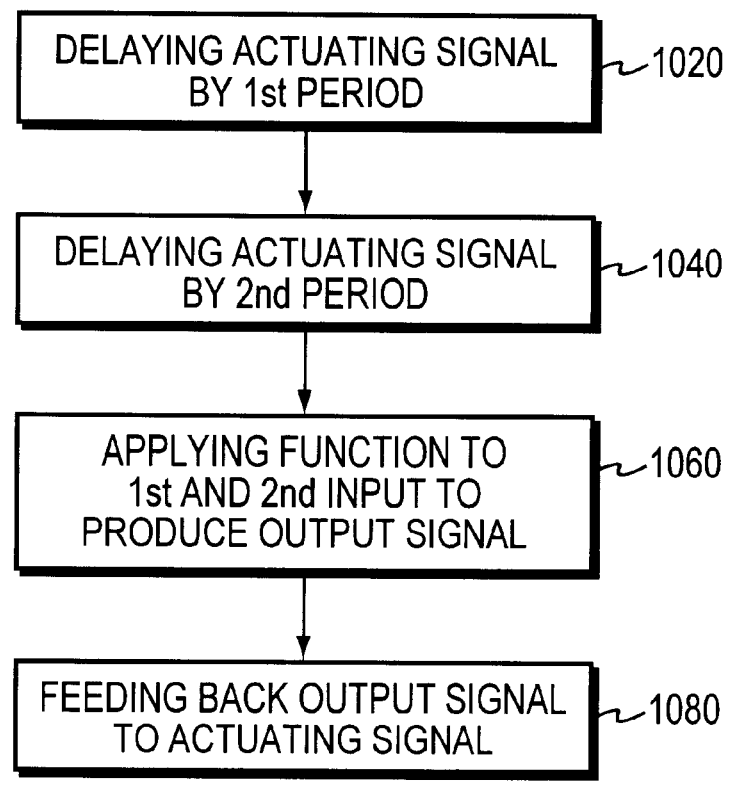
FIG. 26 is a method for generating a pseudo-random noise signal in accordance with the present invention

Some embodiments of the invention are properly described as a method for generating a pseudo-random noise sequence. In such embodiments, as illustrated by FIG. 26, an actuating signal is delayed by a first period to produce a first delayed actuating signal (STEP 1020). The actuating signal is also delayed by a second period to produce a second delayed actuating signal (STEP 1040). A continuous, nonlinear function is applied to a first input that corresponds to the first delayed actuating signal and a second input that corresponds to the second delayed actuating signal to produce an output signal (STEP 1060). The function, which STEP 1060 applies, has values that correspond to the binary integer values of a mod 2 addition function of an LFSR. It also has a non-zero slope at those values. Finally, the output signal is fed back into the actuating signal (STEP 1080) thereby causing the output signal to become a pseudo-random noise signal over time. The method described in FIG. 26 is iterative in that the actuating signal from STEP 1080 is delayed by the first period in STEP 1020 and delayed by the second period in STEP 1040.

Delay: The delay steps (STEPS 1020 and 1040) are such that the second period of delay is approximately an integer multiple of the first period of delay. Although deviation from an exact integer multiple degrades performance, some deviation and the resulting suboptimal performance is often acceptable as a practical matter. Those of skill in the art can straightforwardly determine the tolerable deviation for a particular application. The first and second delay periods may correspond to the delay periods created by the tap placement in a conventional linear feedback shift register. STEP 1040 may further delay the first delayed actuating signal produced by STEP 1020 to produce the second delayed actuating signal. However, STEP 1040 need not follow STEP 1020. Indeed, STEP 1040 may occur any time prior STEP 1060. Similarly, STEP 1020 may occur any time prior STEP 1060.

Applied Function: The function applied in STEP 1060 may have a non-zero slope approaching the binary integer values of a mod 2 addition function of an LFSR. It may have a non-zero slope when the first input equals the second input (i.e., y=x) and, additionally or alternatively, when the first input equals the negative of the second input plus a constant (i.e., y=−x+C). In some embodiments, the function bounds the output signal, for example, by setting the output signal to a positive extreme value that corresponds to a one value of the mod 2 addition function of an LFSR whenever it is greater than or equal to the positive extreme value, and, additionally or alternatively, by setting the output signal to a negative extreme value that corresponds to a zero value of the mod 2 addition function of an LFSR whenever it is less than or equal to the negative extreme value. In determining the slope of the function, the artificial slope imposed by bounding the function (such that it produces a positive extreme value and/or a negative extreme value for input values that correspond to values between the input values for the mod 2 addition function of an the LFSR) is not considered to be the slope of the function. In one embodiment, the function approximates a quadratic function within the bounds. In a related embodiment, the function is a quadratic function. In a second embodiment, the function approximates an absolute value function within the bounds.

In some embodiments of the method, more than one delayed actuating signal is produced by delaying the actuating signal by a period that is approximately an integer multiple of the first period. A function may be applied to each such delayed actuating signal. In these embodiments, additional continuous, nonlinear functions may applied to accommodate the additional inputs. Each additional function will be applied to produce an output signal, and may have values that correspond to the binary integer values of the mod 2 addition function of an LFSR and a non-zero slope at those values. Further, each function will be matched with two inputs, each of which will correspond to a delayed actuating signal or to an output signal. A single output signal will be fed back to the actuating signal, whereby the single output signal will become a pseudo-random noise signal over time. For clarity in these embodiments, STEP 1060 shown in FIG. 26 is known as application of the first function and is said to produce the first output signal.

Figure 27:
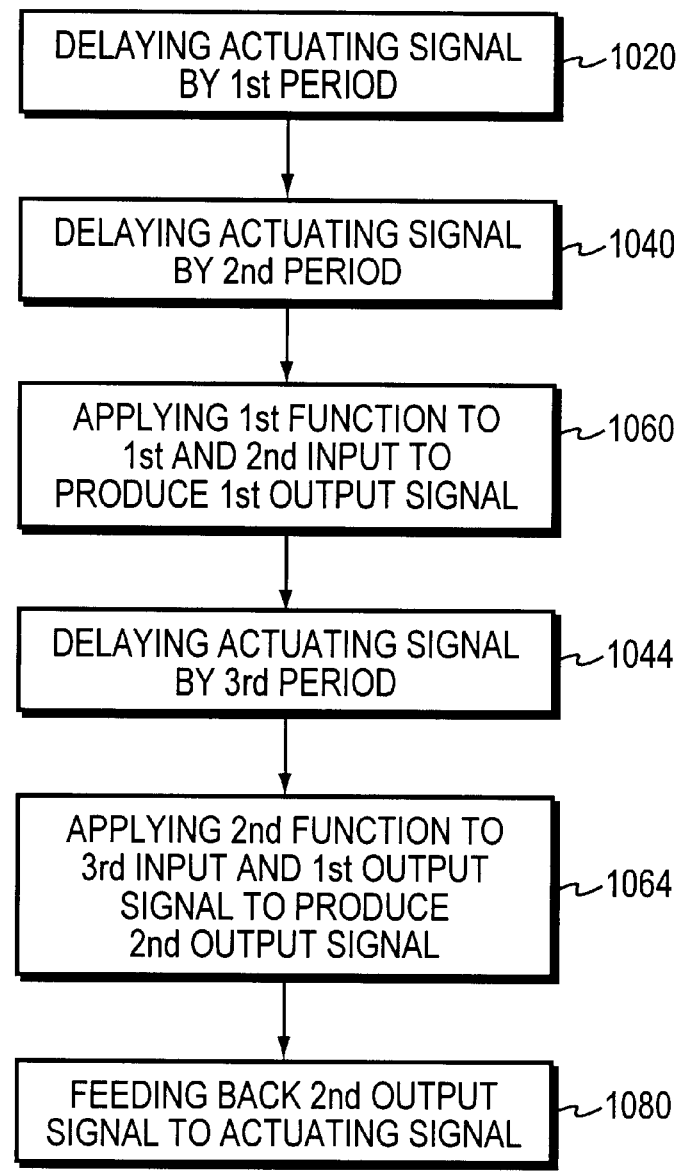
FIG. 27 is a method for generating a pseudo-random noise signal that delays the actuating signal by a third period in accordance with the present invention.

FIG. 27 illustrates an exemplary embodiment of the method in which the method further comprises delaying the actuating signal by a third period to produce a third delayed actuating signal. The actuating signal is delayed by a first period to produce a first delayed actuating signal (STEP 1020) and a second period to produce a second delayed actuating signal (STEP 1040). The first function is applied to a first and a second input that correspond to the first delayed actuating signal and the second delayed actuating signal, respectively, to produce the first output signal (STEP 1060). The actuating signal is delayed by a third period to produce a third delayed actuating signal (STEP 1044). The second and third periods are each approximately integer multiples of the first period. A second function is applied to a third input that corresponds to the third delayed actuating signal and to a fourth input that corresponds to the first output signal to produce a second output signal. The second output signal is fed back to the actuating signal causing the second output signal to become a pseudo-random noise signal over time.

Figure 28:
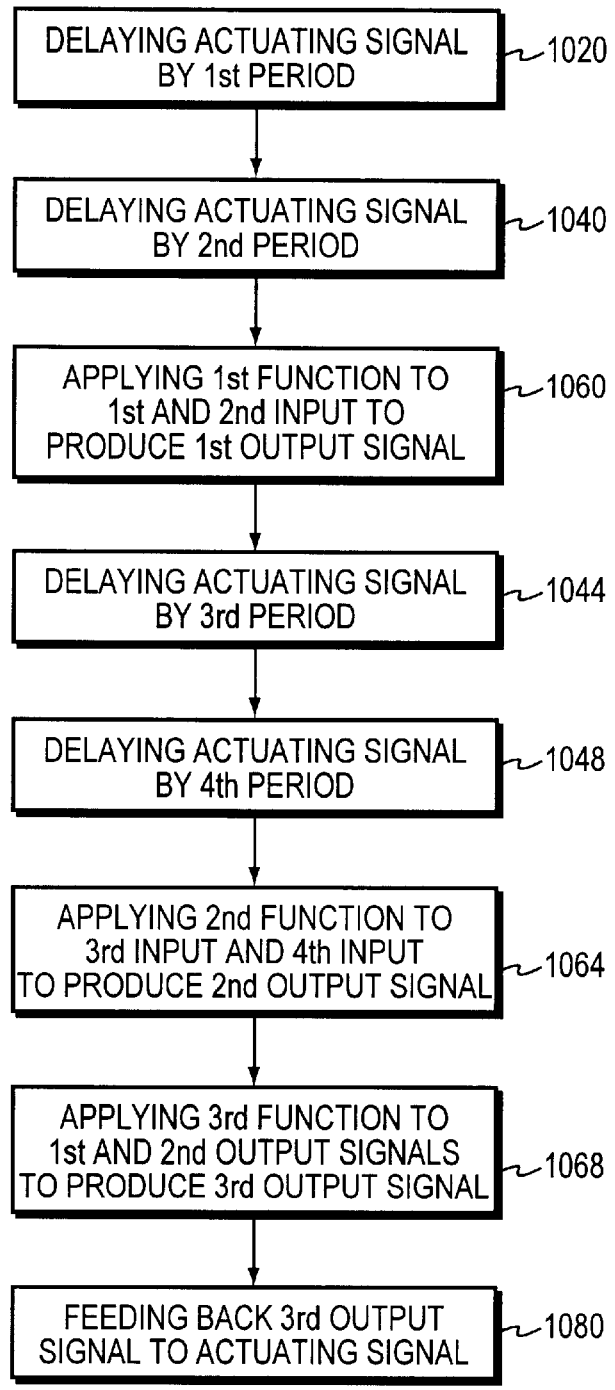
FIG. 28 is a method for generating a pseudo-random noise signal that delays the actuating signal by a third and fourth period in accordance with the present invention.

FIG. 28 illustrates an exemplary embodiment of the method in which the method further comprises delaying the actuating signal by a third and a fourth period to produce a third and a fourth delayed actuating signal, respectively. STEPS 1020 and 1040 produce a first delayed actuating signal and a second delayed actuating signal, respectively. The first function is applied to a first input that corresponds to the first delayed actuating signal and a second input that correspond to the second delayed actuating signal to produce the first output signal (STEP. 1060). The actuating signal is delayed by a third period to produce a third delayed actuating signal (STEP 1044) and by a fourth period to produce a fourth delayed actuating signal (STEP 1048). The second, third, and fourth periods are each approximately integer multiples of the first period. A second function is applied to a third input that corresponds to the third delayed actuating signal and to a fourth input that corresponds to the fourth delayed actuating signal to produce a second output signal (STEP 1064). A third function is applied to a fifth input that corresponds to the first output signal and to a sixth input that corresponds to the second output signal to produce a third output signal (STEP 1068). The third output signal is fed back to the actuating signal causing the third output signal to become a pseudo-random noise signal over time.

Figure 29:
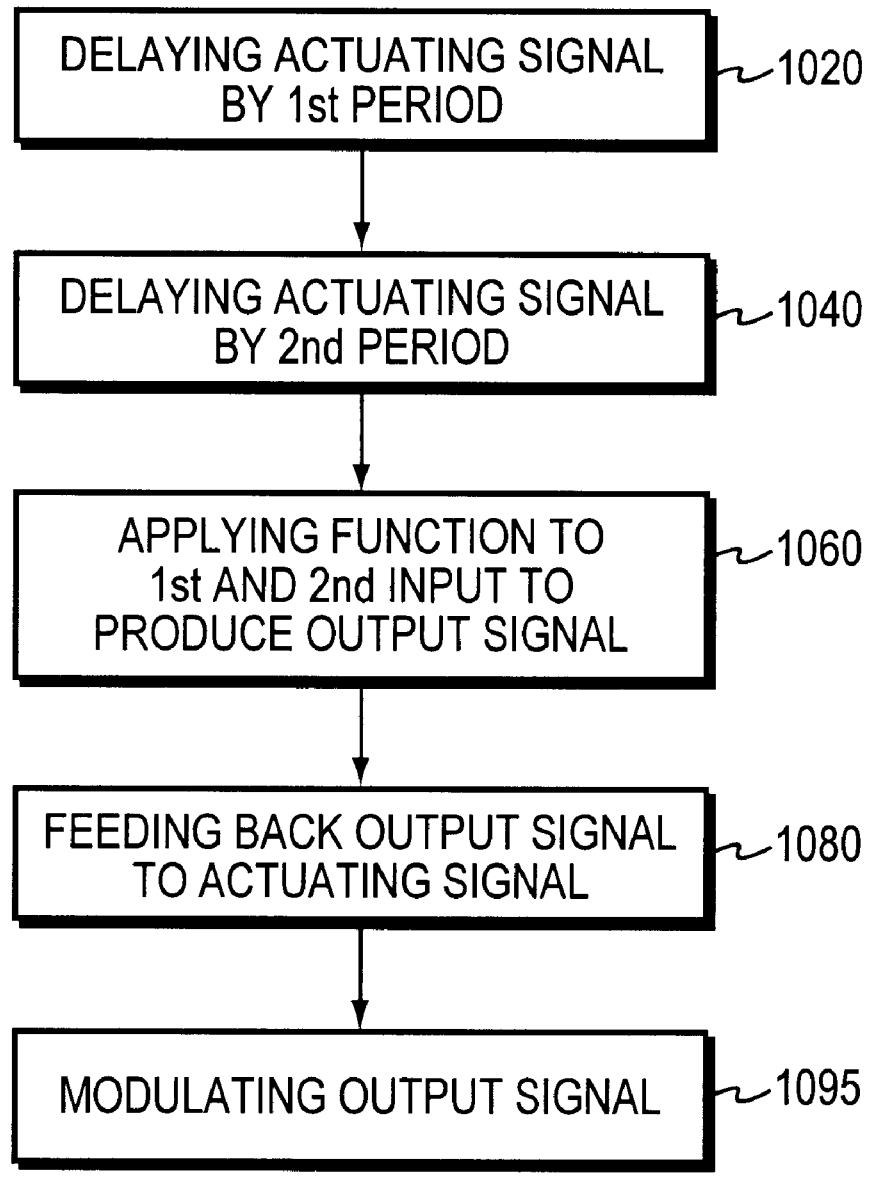
FIG. 29 is a method for generating a modulated pseudo-random noise signal, in accordance with the present invention, which may be used by a transmitter.

Continuous time: Some embodiments of the invention are continuous time methods. A continuous time method may use the first delayed actuating signal as the first input and the second delayed actuating signal as the second input in STEP 1060. As illustrated in FIG. 29, such a method may further comprise modulating the output signal (STEP 1095). The method of FIG. 29 may be used by a transmitter 20 in a spread spectrum communication system 10 to produce a transmit signal.

Figure 30:
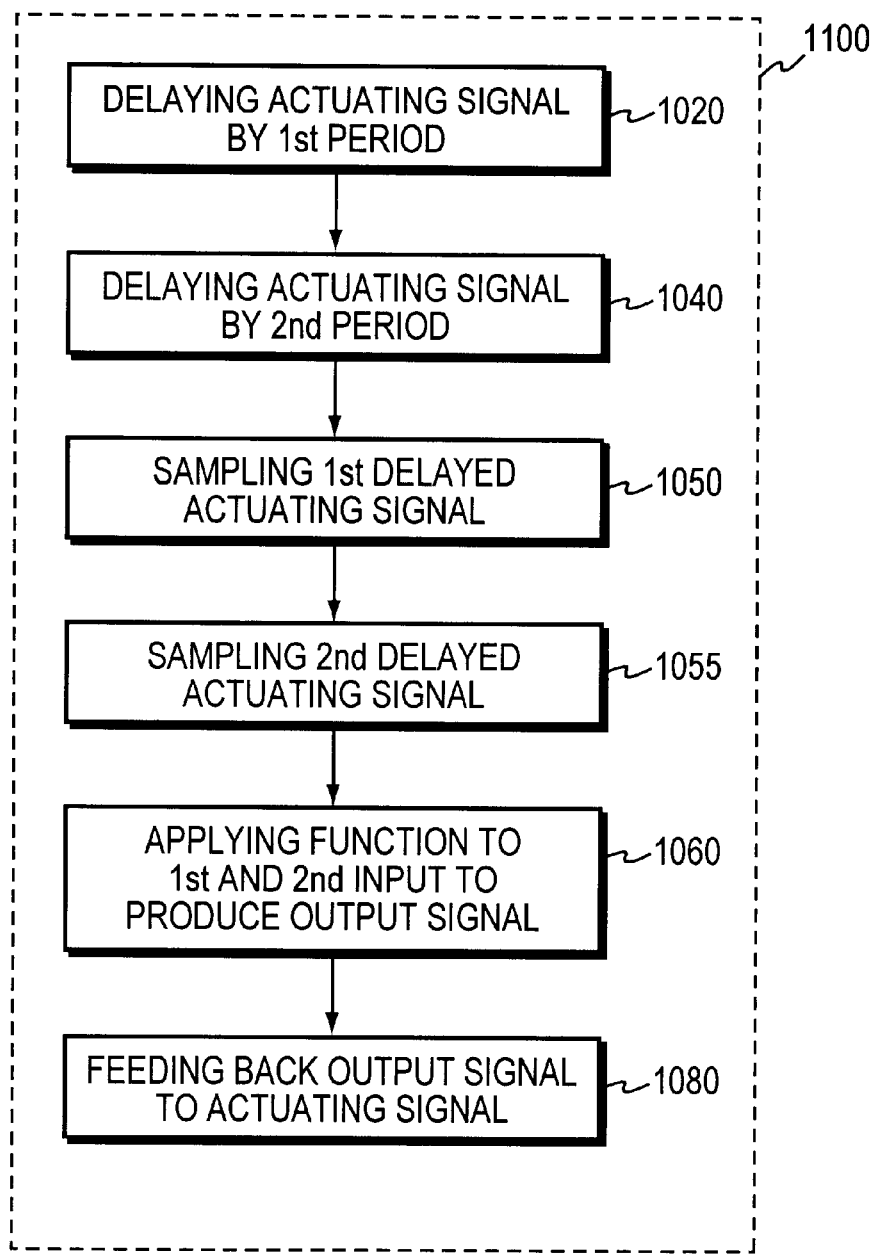
FIG. 30 is a discrete time method for generating a modulated pseudo-random noise signal in accordance with the present invention.

Discrete time: Other embodiments of the invention are discrete time methods. A discrete time method will further comprise signal processing steps prior to STEP 1060. FIG. 30 illustrates a discrete time method. STEPS 1050 and 1055 distinguish FIG. 30 from FIG. 26. In STEP 1050 the first delayed actuating signal produced by STEP 1020 is sampled to create the first input for STEP 1060. Similarly, in STEP 1055 the second delayed actuating signal produced by STEP 1040 is sampled to create the second input for STEP 1060. STEP 1055 need not follow STEP 1050. Indeed, STEP 1055 may occur any time prior STEP 1060. Similarly, STEP 1050 may occur any time prior STEP 1060. The method described in FIG. 30, like that described in FIG. 26, is iterative in that the actuating signal from STEP 1080 is delayed by the first period in STEP 1020 and delayed by the second period in STEP 1040.

The sampling called for in STEPS 1050 and 1055 may be performed in the same way. Each of STEP 1050 and STEP 1055 may further comprise averaging the delayed actuating signal that it receives as input over a period to produce an average signal and sampling the average signal to produce a sample. The averaging period may be the period of one spread spectrum chip. Alternatively, the averaging period may be a portion of the period of one spread spectrum chip.

Where each of STEP 1050 and STEP 1055 comprises averaging a signal, each may further comprise sampling the average signal. The sampling step may be driven by a chip clock signal that triggers the sampling. It may further comprise generating a chip clock signal. A chip clock signal may be generated, for example, from the output signal, a reference input signal, or a sideband carrier of a reference signal.

Acquisition: The general embodiments illustrated in FIGS. 26 or 30 may acquire a reference input signal that is a pseudo-random noise sequence. In such an embodiment, STEP 1080 will comprise superposing the output signal on the reference input signal to produce the actuating signal. In embodiments that involve applying more than one continuous, nonlinear function, the single output signal that is fed back to the actuating signal will be the output signal that is superposed on the reference input signal. The superposition step causes the output signal to acquire the reference input signal over time.

Figure 31:
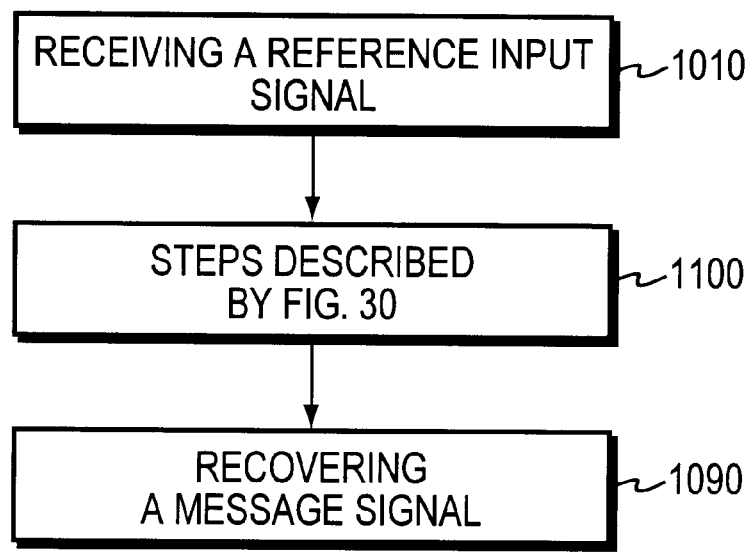
FIG. 31 is a discrete time method for acquiring a pseudo-random noise signal, in accordance with the present invention, which may be used by a receiver.

In embodiments that acquire a reference input signal, the method may used by a receiver 20. As illustrated in FIG. 31, such embodiments may further comprise the step of receiving a reference input signal (STEP 1010). The reference input signal may be a pseudo-random noise signal that is modulated with a message signal or one that is unmodulated. The reference input signal may also be corrupted or attenuated. As further illustrated in FIG. 31, such embodiments may further comprise the step of recovering a message signal from the reference input signal (STEP 1090).

Figure 32:
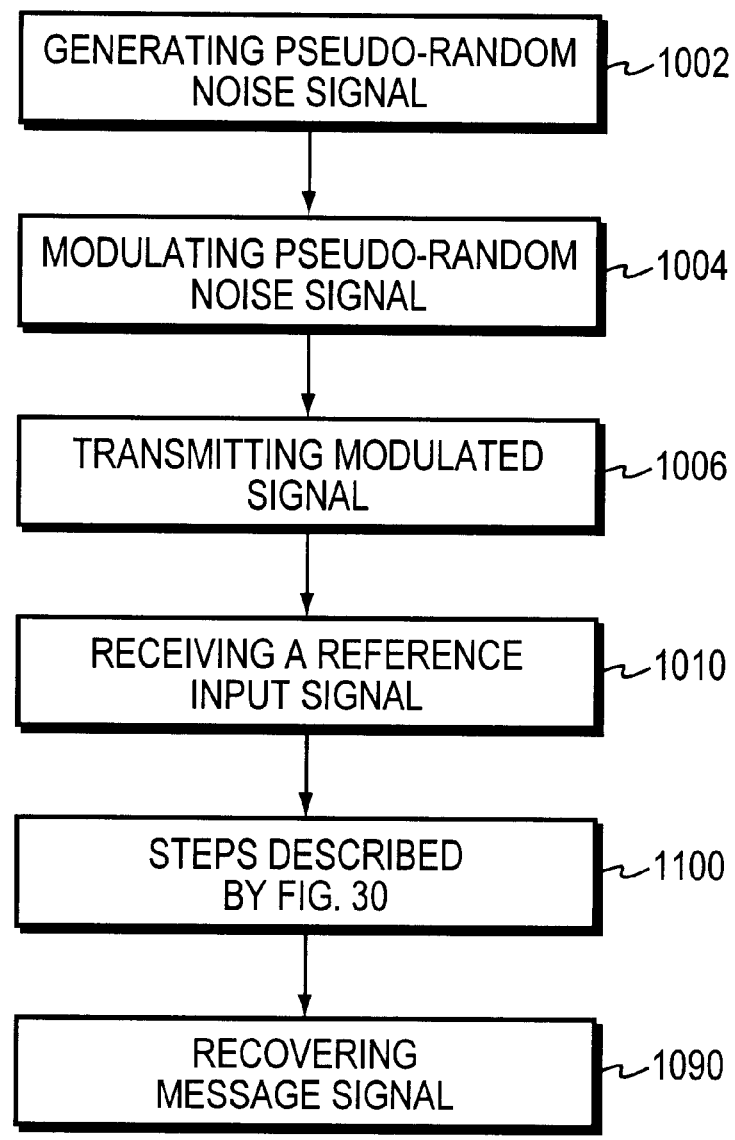
FIG. 32 is a discrete time method of communication, in accordance with the present invention.

The receiver 20 may further be used by a spread spectrum communication system 10. As illustrated in FIG. 32, such embodiments will further comprise the steps of generating a pseudo-random noise signal, modulating the pseudo-random noise signal, and transmitting the modulated signal. A linear feedback shift register may be used to generate the pseudo-random noise signal. Alternatively, the method of the present invention may be used to generate the pseudo-random noise signal. The transmission signal may be corrupted and/or attenuated before it is received as the reference input signal.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An analog feedback method for use in a communication or measurement system, the method comprising the steps of:
   (a) delaying an actuating signal by a first period to produce a first delayed actuating signal;
   (b) delaying the actuating signal by a second period to produce a second delayed actuating signal, wherein the second period is approximately an integer multiple of the first period;
   (c) applying a continuous, nonlinear function to a first input that corresponds to the first delayed actuating signal and a second input that corresponds to the second delayed actuating signal to produce an output signal, wherein (i) the function has values that correspond to the binary integer values of a mod 2 addition function of a linear feedback shift register and (ii) the function has a non-zero slope at the values; and
   (d) feeding back the output signal to the actuating signal, whereby the output signal becomes a pseudo-random noise signal over time.

2. The method of claim 1 wherein the function has a non-zero slope when the first input equals the second input and when the first input equals the negative of the second input plus a constant.

3. The method of claim 2 wherein the function is bounded by setting the output signal to a positive extreme value that corresponds to a one value of the mod 2 addition function of the linear feedback shift register whenever the output signal is greater than or equal to the positive extreme value, and by setting the output signal to a negative extreme value that corresponds to a zero value of the mod 2 addition function of the linear feedback shift register whenever the output signal is less than or equal to the negative extreme value.

4. The method of claim 3 wherein the function approximates an absolute value function within the bounds.

5. The method of claim 3 wherein the function approximates a quadratic function within the bounds.

6. The method of claim 5 wherein the function is a quadratic function within the bounds.

7. The method of claim 1 further comprising the step of:
   delaying the actuating signal by a third period to produce a third delayed actuating signal, wherein (i) the third period is approximately a second integer multiple of the first period, (ii) step (c) produces a first output signal, and (iii) step (d) further comprises:
      applying a second continuous, nonlinear function to a third input that corresponds to the third delayed actuating signal and a fourth input that correspond to the first output signal to produce a second output signal, wherein (i) the second function has values that correspond to the binary integer values of a mod 2 addition function of a linear feedback shift register and (ii) the second function has a non-zero slope at the values; and
      feeding back the second output signal to the actuating signal, whereby the second output signal becomes a pseudo-random noise signal over time.

8. The method of claim 1, wherein step (c) produces a first output signal, and further comprising the steps of:
   delaying the actuating signal by a third period to produce a third delayed actuating signal, wherein the third period is approximately a second integer multiple of the first period;

delaying the actuating signal by a fourth period to produce a fourth delayed actuating signal, wherein the third period is approximately a third integer multiple of the first period; and applying a second continuous, nonlinear function to a third input that corresponds to the third delayed actuating signal and a fourth input that corresponds to the fourth delayed actuating signal to produce a second output signal, wherein (i) the second function has values that correspond to the binary integer values of a mod 2 addition function of a linear feedback shift register and (ii) the second function has a non-zero slope at the values;

and further wherein step (d) further comprises:

applying a third continuous, nonlinear function to a fifth input that corresponds to the first output signal and a sixth input that corresponds to the second output signal to produce a third output signal, wherein (i) the third function has values that correspond to the binary integer values of a mod 2 addition function of a linear feedback shift register and (ii) the third function has a non-zero slope at the values; and feeding back the third output signal to the actuating signal, whereby the third output signal becomes a pseudo-random noise signal over time.

9. The method of claim 3 wherein the first input is a first sample and the second input is a second sample, the method further comprising prior to step (c):

sampling the first delayed actuating signal to produce the first sample; and sampling the second delayed actuating signal to produce the second sample.

10. The method of claim 9 wherein step (d) comprises:

superposing the output signal on a reference input signal to produce the actuating signal, the reference input signal being a pseudo-random noise signal, whereby the actuating signal synchronizes with the reference input signal over time.

11. The method of claim 10 further comprising:

prior to step (a), receiving a reference input signal, wherein the reference input signal is a pseudo-random noise signal that is modulated with a message signal; and after step (d), recovering the message signal from the reference input signal.

12. The method of claim 11 further comprising prior to step (a):

generating a pseudo-random noise signal with a linear feedback shift register, wherein the function applied in step (c) has a stable periodic orbit with binary integer values that corresponds to the pseudo-random noise signal produced by the linear feedback shift register;

modulating the pseudo-random noise signal with a message signal to produce a transmit signal; and transmitting the transmit signal, wherein the reference input signal corresponds to the transmit signal.

13. The method of claim 12 further comprising prior to step (a):

generating a pseudo-random noise signal with an analog feedback shift register;

modulating the pseudo-random noise signal with a message signal to produce a transmit signal; and transmitting the transmit signal, wherein the reference input signal corresponds to the transmit signal.

14. The method of claim 3 wherein the first input is the first delayed actuating signal and the second input is the second delayed actuating signal.

15. The method of claim 14 further comprising, after step (d), modulating the output signal with a message signal to produce a transmit signal.

16. An analog feedback subsystem for use in a communication or measurement system, the subsystem comprising:

a delay element, the delay element delaying an actuating signal by a first period to produce a first delayed actuating signal and delaying the actuating signal by a second period to produce a second delayed actuating signal, wherein the second period is approximately an integer multiple of the first period;

a nonlinear element in signal communication with the delay element, the nonlinear element applying a continuous, non-linear function to a first input that corresponds to the first delayed actuating signal and a second input that corresponds to the second delayed actuating signal to produce an output signal, wherein (i) the function has values that correspond to the binary integer values of a mod 2 function of a linear feedback shift register and (ii) the function has a non-zero slope at the values; and a feedback connection creating signal communication between the nonlinear element and the delay element, the feedback connection communicating the output signal to the delay element, whereby the output signal becomes a pseudo-random noise signal over time.

17. The apparatus of claim 16 wherein the function of the nonlinear element has a non-zero slope when the first input equals the second input and when the first input equals the negative of the second input plus a constant.

18. The apparatus of claim 17 wherein the nonlinear element further comprises a gain element that clips the output signal by setting the output signal to a positive extreme value that corresponds to a one value of the mod 2 addition function of the linear feedback shift register whenever the output signal is greater than or equal to the positive extreme value, and by setting the output signal to a negative extreme value that corresponds to a zero value of the mod 2 addition function of the linear feedback shift register whenever the output signal is less than or equal to the negative extreme value.

19. The apparatus of claim 18 wherein the nonlinear element approximates an absolute value function when the output signal is within a range between the positive extreme value and the negative extreme value.

20. The apparatus of claim 18 wherein the nonlinear element approximates a quadratic function when the output signal is within a range between the positive extreme value and the negative extreme value.

21. The apparatus of claim 20 wherein the nonlinear element comprises an analog multiplier.

22. The apparatus of claim 20 wherein the nonlinear element comprises a double balanced mixer.

23. The apparatus of claim 16, wherein the nonlinear element is a first nonlinear element that produces a first output signal, wherein the delay element further delays the actuating signal by a third period to produce a third delayed actuating signal, wherein the third period is approximately a second integer multiple of the first period, the apparatus further comprising:

wherein the feedback connection creates signal communication between the first nonlinear element and the delay element via a second nonlinear element, the second nonlinear element applying a second continuous, non-linear function to a third input that corresponds to the third delayed actuating signal and a fourth input that corresponds to the first output signal to produce a second output signal, wherein (i) the second function has values that correspond to the binary integer values of a mod 2 function of a linear feedback shift register and (ii) the second function has a non-zero slope at the values, the feedback connection communicating the second output signal to the delay element, whereby the second output signal becomes a pseudo-random noise signal overtime.

24. The apparatus of claim 16, wherein the nonlinear element is a first nonlinear element that produces a first output signal, wherein the delay element further delays the actuating signal by a third period to produce a third delayed actuating signal and by a fourth period to produce a fourth delayed actuating signal, wherein the third period is approximately a second integer multiple of the first period and the fourth period is approximately a third integer multiple of the first period, the apparatus further comprising:

a second nonlinear element in signal communication with the delay element, the nonlinear element applying a continuous, non-linear function to a third input that corresponds to the third delayed actuating signal and a fourth input that corresponds to the fourth delayed actuating signal to produce a second output signal, wherein (i) the second function has values that correspond to the binary integer values of a mod 2 function of a linear feedback shift register and (ii) the second function has a non-zero slope at the values;

and further wherein the feedback connection creates signal communication between the first nonlinear element, the second nonlinear element, and the delay element via a third nonlinear element, the third nonlinear element applying a third continuous, non-linear function to a fifth input that corresponds to the first output signal and a sixth input that corresponds to the second output signal to produce a third output signal, wherein (i) the third function has values that correspond to the binary integer values of a mod 2 addition function of a linear feedback shift register and (ii) the third function has a non-zero slope at the values, the feedback connection communicating the third output signal to the delay element, whereby the third output signal becomes a pseudo-random noise signal over time.

25. The apparatus of claim 18 wherein the first input is a first sample of the first delayed actuating signal and the second input is a second sample of the second delayed actuating signal, the apparatus further comprising:

a first sampling device in signal communication with the nonlinear element and the first delayed actuating signal from the delay element, the first sampling device sampling the first delayed actuating signal to produce the first sample; and a second sampling device in signal communication with the nonlinear element and the second delayed actuating signal from the delay element, the second sampling device sampling the second delayed actuating signal to produce the second sample.

26. The apparatus of claim 25 wherein the first sampling device further comprises:

a first low pass filter in signal communication with the first delayed actuating signal from the delay element, the first low pass filter averaging the first delayed actuating signal to produce a first signal average; and a first sample and hold in signal communication with the first low pass filter and the nonlinear element, the first sample and hold producing the first sample by sampling a portion of the first signal average, wherein the first sample and hold is driven by a chip clock signal; and wherein the second sampling device further comprises:

a second low pass filter in signal communication with the second delayed actuating signal from the delay element, the second low pass filter averaging the second delayed actuating signal to produce a second signal average; and a second sample and hold in signal communication with the second low pass filter and the nonlinear element, the second sample and hold producing the second sample by sampling a portion of the second signal average, wherein the second sample and hold is driven by the chip clock signal.

27. The apparatus of claim 26 wherein the feedback connection further comprises:

an adder in signal communication with the nonlinear element and the delay element, the adder superposing the output signal on a reference input signal to produce the actuating signal.

28. The apparatus of claim 27 further comprising:

an input device in signal communication with the adder, the input device receiving a reference input signal, wherein the reference input signal is a pseudo-random noise signal that is modulated with a message signal; and a demodulator in signal communication with the input device and the nonlinear element, the demodulator recovering the message signal from the reference input signal.

29. The apparatus of claim 28 further comprising:

a phase locked loop in signal communication with the nonlinear element, the phase locked loop generating the chip clock signal from the output signal.

30. The apparatus of claim 28 further comprising:

a phase locked loop in signal communication with the input device, the phase locked loop generating the chip clock signal from the reference input signal.

31. The apparatus of claim 28 further comprising:

a linear feedback shift register, the linear feedback shift register generating a pseudo-random noise signal, wherein the function of nonlinear element has a stable periodic orbit with binary integer values that correspond to the pseudo-random noise signal produced by the linear feedback shift register;

a data modulator, the data modulator modulating the pseudo-random noise signal with a message signal to produce a transmit signal; and a transmission device, the transmission device transmitting the transmit signal, wherein the reference input signal corresponds to the transmit signal.

32. The apparatus of claim 18 wherein the delay element further comprises:
   a first delay element in signal communication with the nonlinear element, the first delay element delaying the actuating signal by the first period to produce the first delayed actuating signal; and
   a second delay element in signal communication with the nonlinear element, the second delay element delaying the actuating signal by the second period to produce the second delayed actuating signal, wherein the second period is an integer multiple of the first period.

33. The apparatus of claim 18 wherein the first input is the first delayed actuating signal and the second input is the second delayed actuating signal.

* * * * *